Oct. 8, 1968    D. E. HASELWOOD    3,405,393
DATA HANDLING SYSTEM
Filed Oct. 15, 1965    9 Sheets-Sheet 1
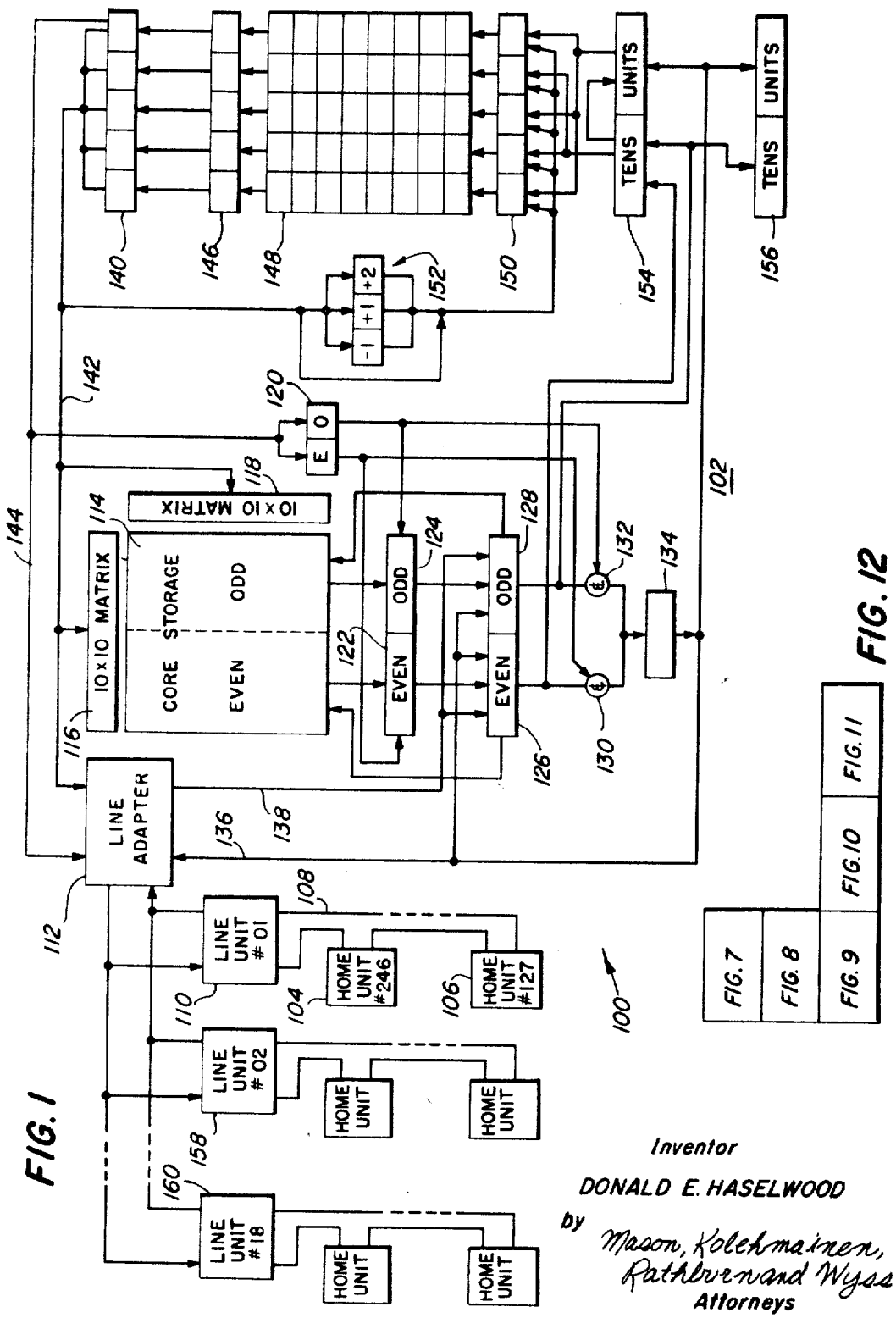
Inventor
DONALD E. HASELWOOD
by Mason, Kolehmainen,
Rathburn and Wyss.
Attorneys

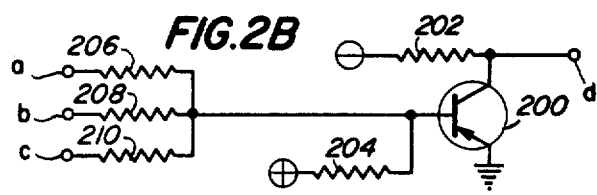
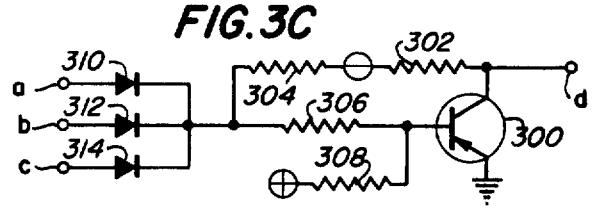
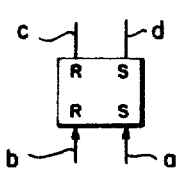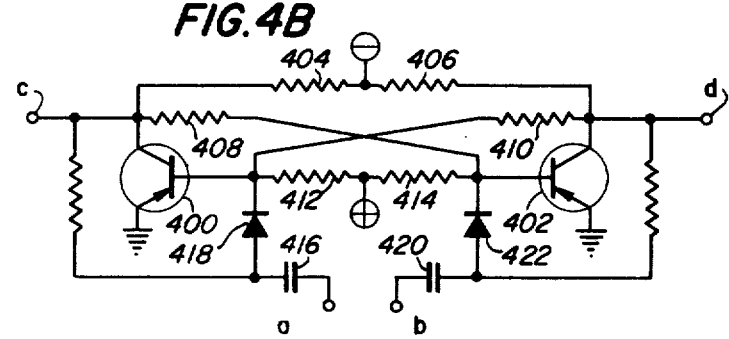
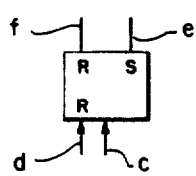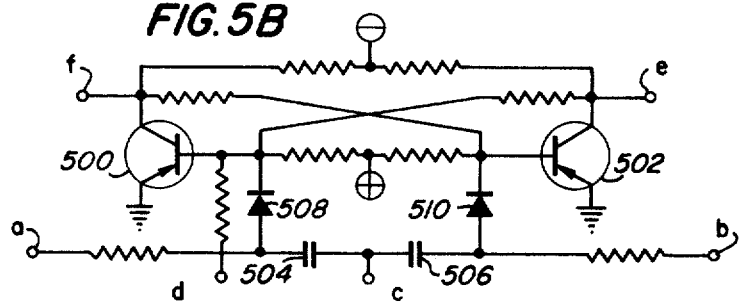
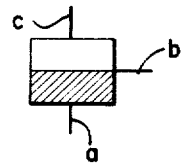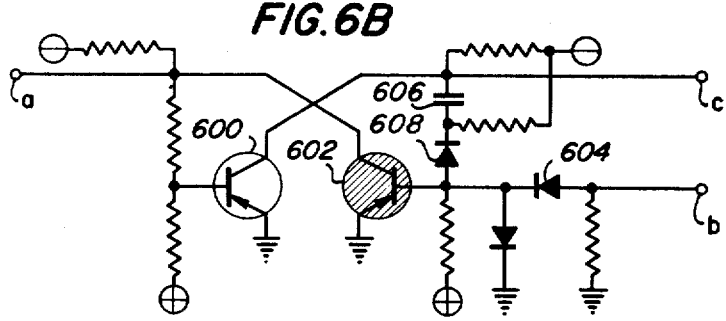

Oct. 8, 1968  D. E. HASELWOOD  3,405,393
DATA HANDLING SYSTEM
Filed Oct. 15, 1965  9 Sheets-Sheet 6

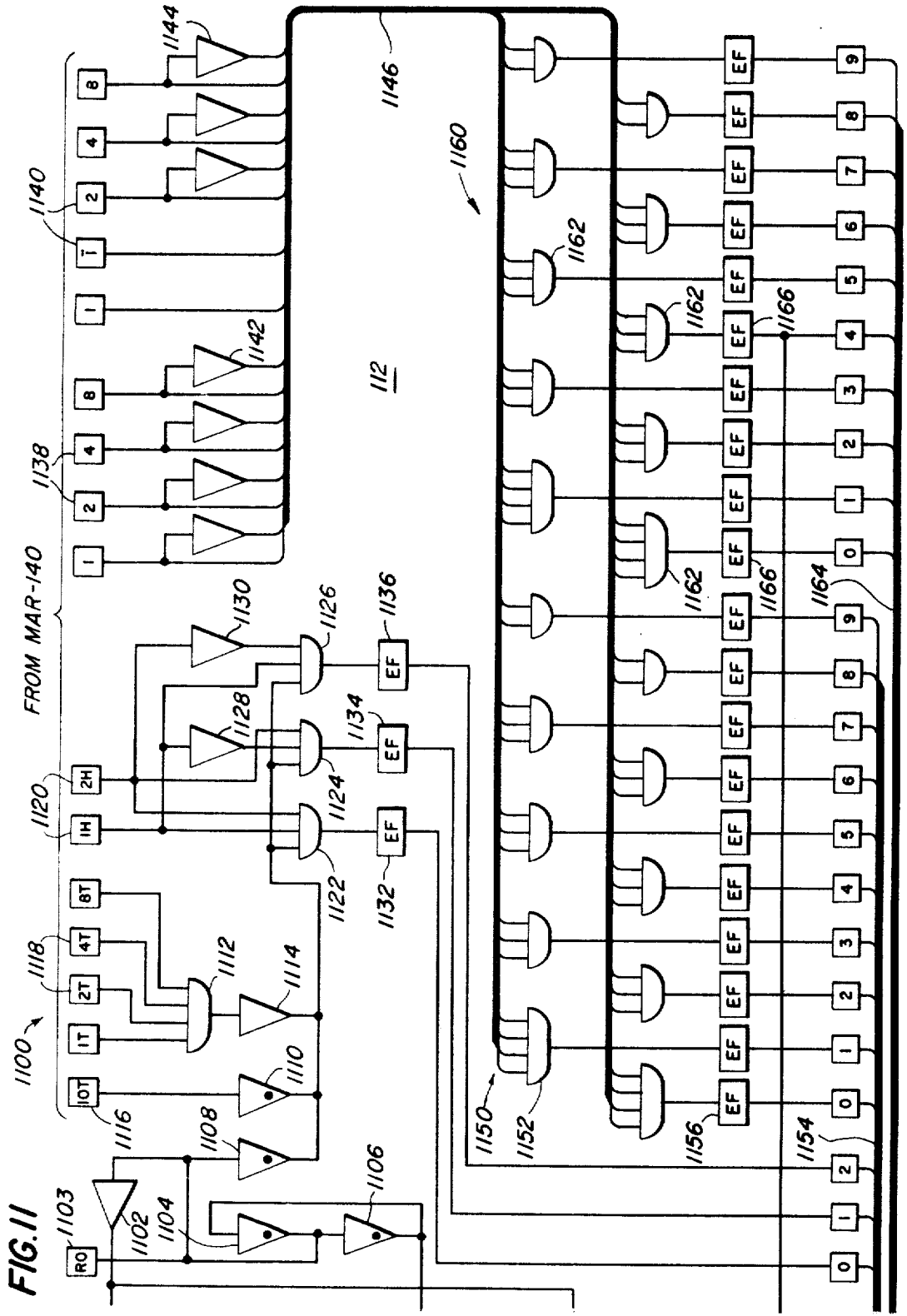

| OPERATION CODE | P-ADDRESS | DATA AT P-ADDRESS | Q-ADDRESS | DATA AT Q-ADDRESS |
|---|---|---|---|---|
| 43 | <20000 | Address of new instruction | 30010 | Busy digit at line unit #01 |
| 26 | 01000 | Receives first reply digit | 30019 | Sends first reply digit from prior call |
|  | 00999 | Receives second reply digit | 30018 | Sends second reply digit from prior call |
|  | → | → |  |  |
|  | 00995 | Receives last or sixth reply digit | 30014 | Sends last or sixth reply digit from prior call |
| 26 | 30013 | Receives units digit of next called station | 15008 | Stores units digit of next called station designation (7) |
|  | 30012 | Receives tens digit of next called station | 15007 | Stores tens digit of next called station designation (2) |
|  | 30011 | Receives hundreds digit of next called station | 15006 | Stores hundreds digit of next called station designation (1) |
| 43 | <20000 | Address of new instruction | 30010 | Busy digit at line unit #01 |
| 26 | 00756 | Receives first reply digit | 30019 | Sends first reply digit from prior call to station 127 on line unit #01 |
|  | 00755 | Receives second reply digit | 30018 | Sends second reply digit from prior call to station 127 on line unit #01 |
|  | → | → |  |  |
|  | 00751 | Receives last or sixth reply digit | 30014 | Sends last or sixth reply digit from prior call to station 127 on line unit #01 |

FIG. 14

United States Patent Office 3,405,393
Patented Oct. 8, 1968

3,405,393
DATA HANDLING SYSTEM
Donald E. Haselwood, Deerfield, Ill., assignor to A. C. Nielsen Company, Chicago, Ill., a corporation of Delaware
Filed Oct. 15, 1965, Ser. No. 496,361
24 Claims. (Cl. 340—172.5)

ABSTRACT OF THE DISCLOSURE

A data handling system for collecting and processing data from a plurality of external stations combines a computer or central data processor and its addressable storage and addressing units with a data acquisition network that permits data requests and collected data to flow between the computer and the external stations without special instruction or address conversion. Addressable line terminating units containing a register are added to the computer's usual storage facility, and each line unit is associated with a group of the remote stations. Each line unit also includes circuitry for interrogating the remote stations. When a number corresponding to a particular station is placed in one of these registers from addressable storage in the computer, the associated circuitry automatically interrogates the selected station. The data returned by the station is placed in the same register and then transferred into addressable storage from which it is available to the computer.

---

This invention relates to a data handling system and, more particularly, to a system for automatically collecting data from a plurality of remote stations.

A number of systems are now in use for collecting data from a number of remote points and for recording the collected data in reproducible form to permit the subsequent use of the data. As an example, in systems and apparatus for determining the listening habits of wave signal receiver users, data relating to the "on-off" and tuning conditions of wave signal receivers is automatically collected and stored in attachments connected to the receivers located in the geographically scattered homes of the collaborators included in the sample. In some systems, the data is stored in the receiver attachment in a permanent form on a record, and the records in the homes in the sample are collected and transported to a central office in which the stored data is reproduced and supplied to tabulating equipment. In other systems, the data collected in the homes is stored in temporary form in the attachments, and the attachments are connected over a suitable signaling or data transmission channel, such as a telephone or telemetering line, to a central office containing tabulating and recording means. The central office can initiate the sequential or concurrent transmission of the collected data from the attachments at any desired time.

In systems of the type described above, the collected data is frequently used to provide statistical bases for the comparison of radio and television viewing audiences, and there are a number of instances in which it would be desirable to be able to provide the results derived from the collected data substantially contemporaneously with the collection of the data. This cannot be done in those systems in which the data records are periodically collected from the collaborators' homes. However, it can be achieved in systems in which the data is automatically relayed over a signaling channel to the central data collecting or handling office, and the speed and accuracy of the statistical compilation is further enhanced if the requests for the data from the remote points and the data returned from the remote points are directly effected and controlled by computing means used to establish the compilation. In the most advantageous arrangement, the requests for and the transfer of data from the remote points should form an integral part of the computer program, and the data requests and received data are directly transferred between the computer memory and the remote points at speeds within the normal operating cycle of the computer. With this arrangement, it would be possible to perform the compilations and calculations required to establish the comparison interspersed with the collection of data, and the tabulating and data collecting equipment would require only a single common control. In addition, the time loss and inaccuracies resulting from transferring data from an incoming data storage medium to the internal memory of the computer would be avoided.

Accordingly, one object of the present invention is to provide a new and improved data handling system.

Another object is to provide an audience rating system in which it is possible to substantially contemporaneously collect and compile information relating to the use of wave signal receivers.

Another object is to provide a system for automatically collecting and compiling data from individually designated stations located at geographically remote points in which units for transmitting selecting designations to and receiving variable data from the stations are selectively rendered effective under the control of a central computing means used for compiling received data.

A further object is to provide a system for automatically collecting data from remote stations connected to different signaling channels having different addresses in which a central control computer storing the designations of the stations selects the channels by address and transfers the station designations over the addressed channels to cause the return of data to the controlling computer from the remote stations.

A further object is to provide a system for automatically collecting data from remote stations under the control of a central computing means including new and improved means for effecting the transfer of station selecting designations to and the return of variable data items from the remote stations by means clocked or synchronized by the central computing means.

A further object is to provide a system for automatically collecting data from remote and individually designated stations using a computer having individually addressed storage units for storing both station designations and reply data in which different signaling channels leading from the computer to the stations are individually addressed and in which the addresses are presented by the computer to select channels to receive station designations from addressed storage units to cause the selection of the desired remote stations.

A further object is to provide a system of the type set forth above in which other addresses presented by the computer select channels to transfer data previously received from the selected stations to addressed ones of the storage units.

A further object is to provide a data handling system in which data is transmitted from remote stations to a central data handling office including new and improved means for checking the accuracy of transmitted and received data.

Another object is to provide a data handling system in which data is relayed between central and remote points which includes new and improved means for checking the condition of signaling channels interconnecting the central and remote points.

Many other objects and advantages of the present invention will become apparent from considering the following detailed description in conjunction with the drawings in which:

FIG. 1 is a schematic diagram of a data handling system embodying the present invention;

FIG. 2A illustrates a logic symbol for a NOR gate circuit;

FIG. 2B is a typical NOR gate circuit;

FIG. 3A illustrates a logic symbol for a NAND gate circuit;

FIG. 3B illustrates a logic symbol for a NOT or inverting circuit;

FIG. 3C is a typical NAND gate circuit;

FIG. 4A illustrates a logic symbol for a control flip-flop circuit;

FIG. 4B is a typical control flip-flop circuit;

FIG. 5A illustrates a logic symbol for a binary counter and shift register flip-flop circuits;

FIG. 5B is a typical binary counter and shift register flip-flop circuit;

FIG. 6A illustrates a logic symbol for a monostable multivibrator circuit;

FIG. 6B is a typical monostable multivibrator circuit;

Figure 7:
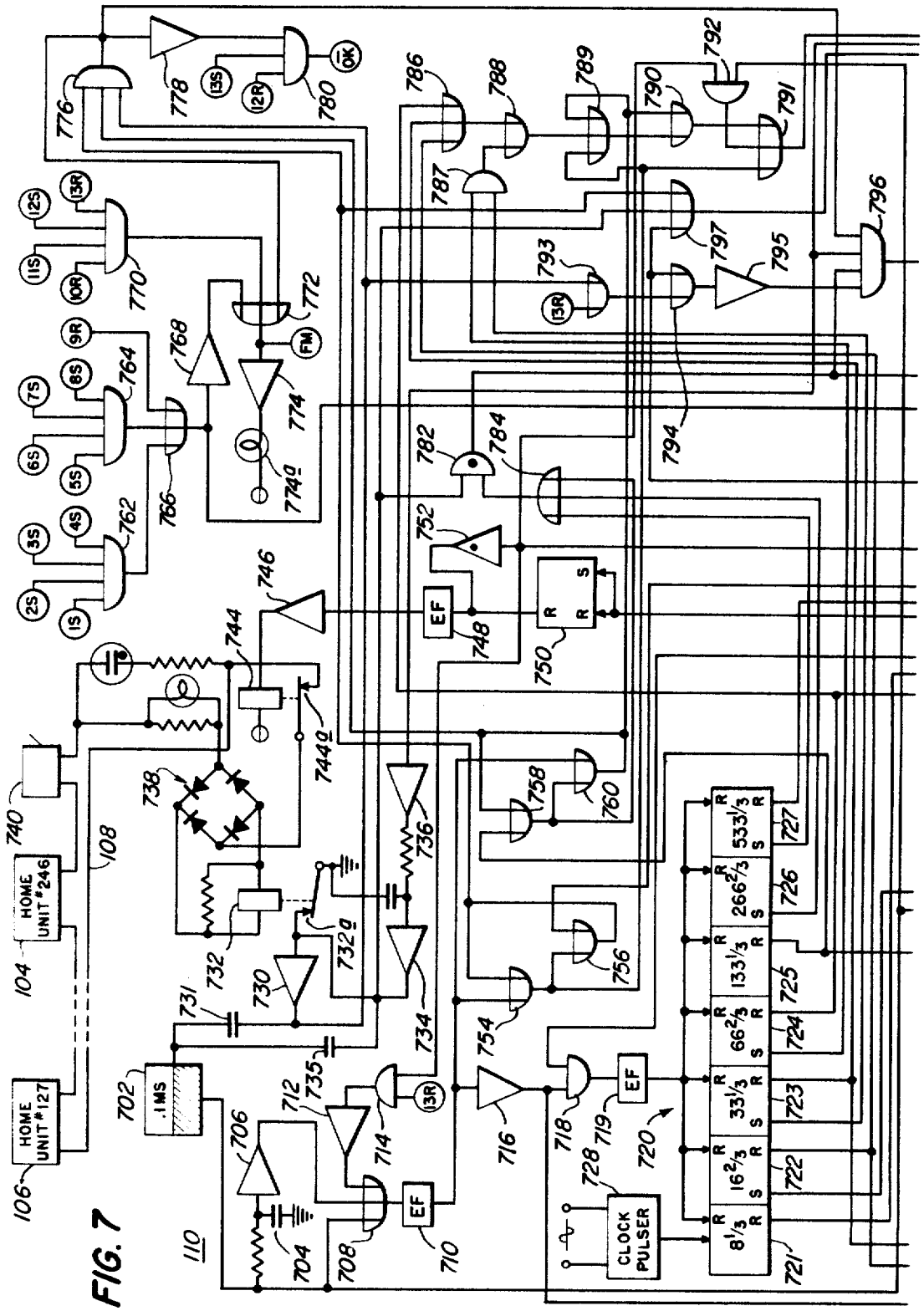
Figure 8:
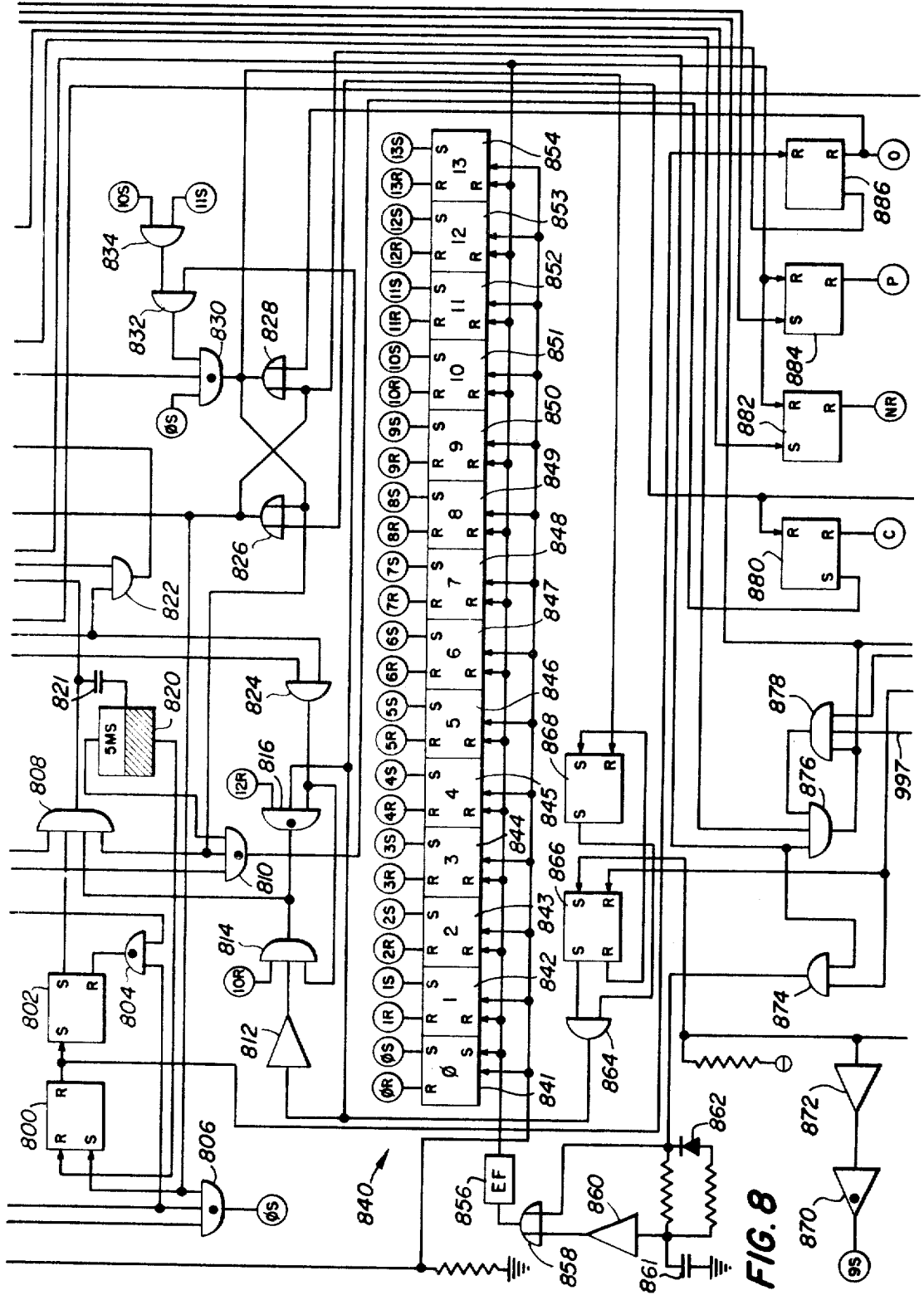
Figure 9:
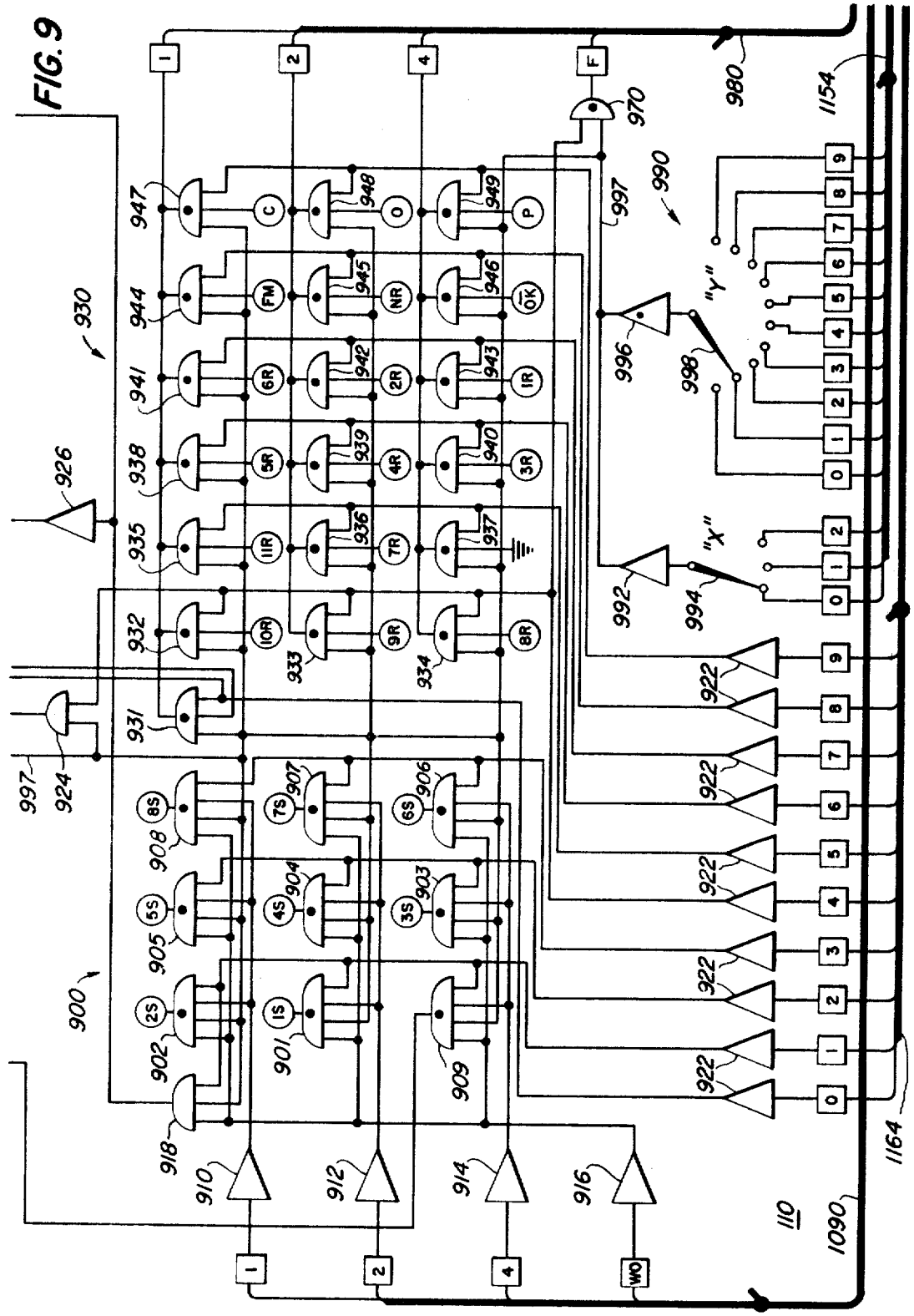
Figure 10:
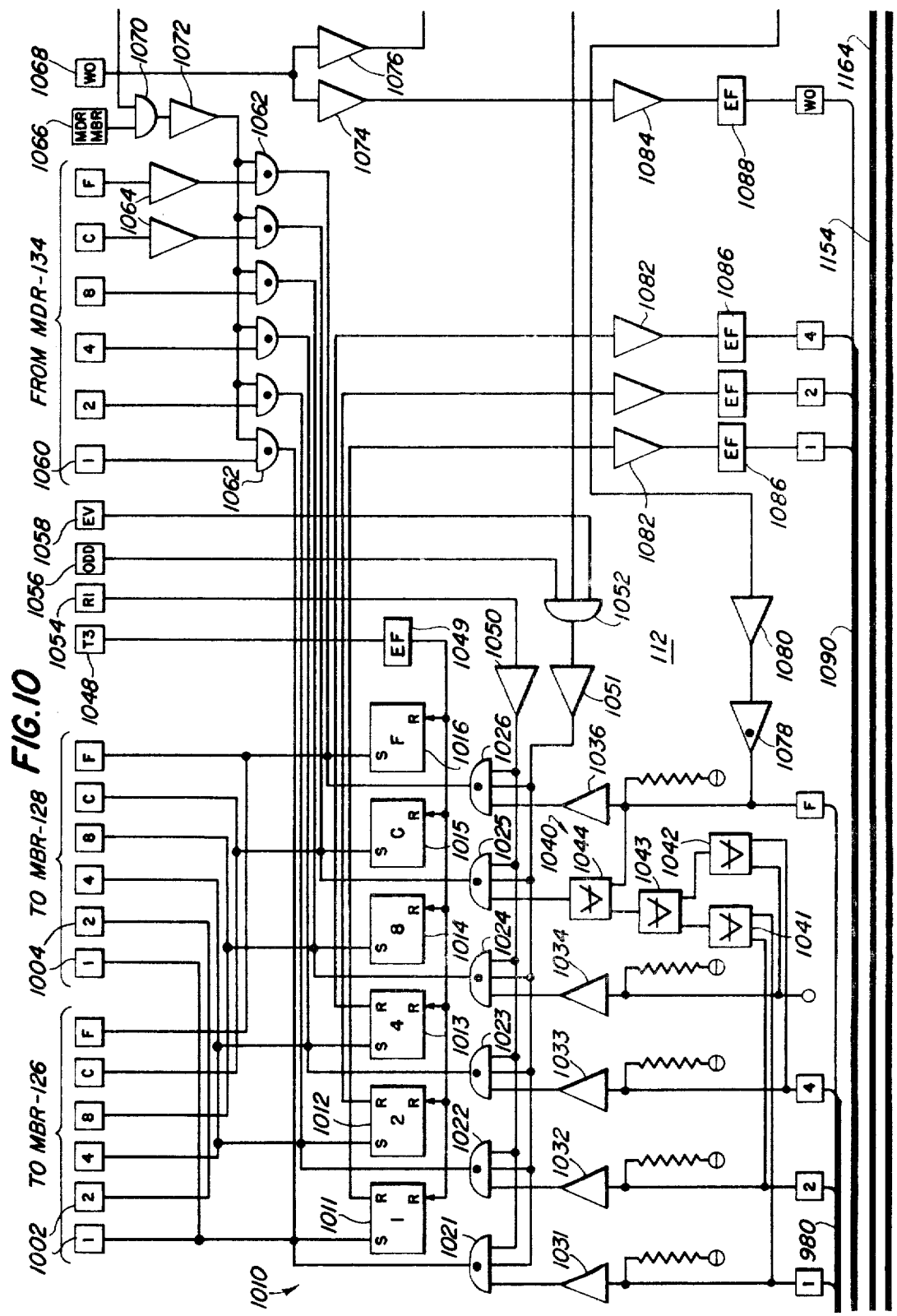
Figure 13:

FIGS. 7–11 form a schematic diagram of the data handling system;

FIG. 12 is a block diagram illustrating the manner in which FIGS. 7–11 of the drawings are disposed adjacent each other to form a complete circuit diagram;

FIG. 13 is a table illustrating one form of coded information handled by the system; and FIG. 14 is a table listing representative sequences of instructions used to control the operation of the system.

Referring now more specifically to FIG. 1 of the drawings, therein is illustrated a block diagram of a system 100 embodying the present invention. The system 100 consists of a central data handling unit or computing means 102 which establishes ratings based on the viewing habits of a sample of collaborators located in areas geographically remote from the computer 102 whose receivers are provided with a home unit, such as the home unit 104 or 106. Different groups of the home units, such as the home units 104 and 106, are connected to a common signaling channel, such as the signaling channel 108, and each of these signaling channels is terminated in a line unit, such as a line unit 110 connected to the channel 108. All of the line units are coupled by a line adapter 112 to the computer 102.

The computer or central data handling means 102 automatically collects wave signal use and tuning condition information from the plurality of home units 104, 106 scattered over a large geographical area, such as the United States, and utilizes the collected information to establish ratings. Since the computing means 102 is capable of performing all of the operations necessary to establish the ratings and is capable of demanding and receiving all of the external information necessary to establish the ratings as it is needed, the ratings are available without time delay and any inaccuracy arising from translating data derived from the receivers into a form suitable for use in the computer is avoided.

Each of the home units, such as the home units 104 and 106, is identified by an individual designation, such as the designation "246" for the home unit 104 or the designation "127" for the home unit 106 and is placed in operation of the receipt of its individual designation from the connected signaling channel, such as the signaling channel 108. In response to the receipt of its individual designation, the selected home unit 104, 106 transmits data over the connected signaling channel 108 to the terminating line unit 110 representing items of variable data derived from the home wave signal receiver or receivers to which the selected home unit is connected. These variable data items commonly include the tuning condition of the wave signal receiver and its on or off condition. The information transmitted over the signaling channel 108 from the selected home unit is stored in the connected line unit, such as the line unit 110.

Although the home units 104, 106 can be of any suitable construction, they preferably comprise units of the type shown and described in detail in the copending applications of Charles H. Currey et al., Ser. No. 232,684, filed Oct. 24, 1962 and Donald E. Haselwood et al., Ser. No. 410,475, filed Nov. 12, 1964, both of which copending applications are assigned to the same assignee as the present application. The home units shown in these two pending applications are designed to receive identifying or designation signals and to transmit variable data item signals using a variable pulse duration technique in which binary "0's" and "1's" are represented by signals of two different time durations. Each of these units stores its own individual designation which is compared with signals applied to the channel 108. When a received signal matches the individual designation of the given one of the home units, i.e., when the home unit 104 receives signals representing the designation "246," the station whose designation has been received is operated from a normal receiving mode to a transmitting mode and returns variable time duration signals to the connected channel, such as the channel or signaling loop 108, representing the variable items of information that are to be transferred to the computer 102. These items are stored in the line unit 110 until demanded by the computer 102. The line adapter 112 provides an interface between the plurality of line units and central data handling unit 102.

The central data handling unit 102 can comprise any suitable data handling or processing unit of the many types well known in the art. To illustrate the operation and construction of the system 100, this system is illustrated in conjunction with a "1620 Data Processing System" manufactured by International Business Machines Corporation. Since the construction and operation of this particular data processing system is shown and described in detail in a large number of publications, only a brief and simplified description of those portions of its operations which relate to the operation and control of the system 100 are described. As an example, the unit 102 obviously includes means, such as a printer or a punch assembly, by which a permanent record of the output data is provided. Further, the brief description of the illustrated computing means 102 utilizes the same nomenclature used in the available publications describing the specific "1620 Data Processing System" illustrated in the application.

In general, the computing means 102 includes a magnetic core storage unit or memory 114 providing twenty thousand individually addressed digit storage units, each providing the binary values or bits "1," "2," "4," and "8," a parity of check bit, and a flag bit. Access to the magnetic memory 114 is obtained by a pair of 10 x 10 selection or switching matrices 116 and 118 in combination with an odd and even control 120 which selectively enables and inhibits a pair of odd and even current sensing or readout amplifiers 122 and 124. In this manner, any one of the twenty thousand storage units in the memory 114 can be accessed by an address in the range between "00000" and "19999."

The outputs of the amplifiers 122 and 124 are supplied to a pair of memory buffer registers (MBR) 126 and 128 which store two digits read out of the memory to provide means for selectively returning two digits to the memory 114 and supplying a digit through a pair of logic gates 130 and 132 selectively enabled by the odd-even control 120 to a memory data register (MDR) 134. By selectively enabling the memory buffer registers 126 and 128, a digit read from the memory 114 can be cleared or restored to its prior storage location. In the illustrated system 100, the memory buffer register 126, 128 is not only supplied with input signals from the current sensing amplifiers 122 and 124 and a main data bus 136 connected to the output of the memory data register 134 but also from the line adapter 112 over a line 138.

The selection of a storage unit in the memory 114 to receive or to deliver a digit is controlled by a memory address register (MAR) 140 whose output is connected over a cable or bus 142 to the switching matrices 116 and 118 and also to the input of the line adapter 112. The memory address register 140 also supplies an odd-even control signal which is forwarded over a conductor 144 to the odd-even control 120 and to an input of the line adapter 112. The input of the memory address register 140 is coupled by a plurality of output or current sensing amplifiers 146 to a memory address register storage unit 148 including a plurality of memory address registers for storing different instruction addresses. The input to the memory address register storage 148 is coupled to a group of input or current amplifiers 150, the inputs of which are coupled to the output of the memory address register 140 through an increment-decrement control 152 and to a digit register 154 which is supplied with information from the memory buffer registers 126, 128 and the memory data register 134. An operation register 156 is provided for storing an operation code which controls the nature of the function or data handling operation performed by the computer 102.

The computer 102 is designed for operation with a twelve digit instruction consisting of a two digit operation code, a five digit "P" address, and a five digit "Q" address. The two digit operation code determines the nature of the data handling operation performed by the computer 102, and, insofar as the present application is concerned, the "P" and "Q" addresses are used to specify locations from which and to which data is transmitted and received. When an instruction is transferred from the memory 114 to the address storing portion of the computer 102, the operation code is transferred to the operation register 156, and the "P" and "Q" addresses are stored in different ones of the registers in the memory address register storage 148, the particular "P" and "Q" address to be used being transferred to the memory address register 140 through the amplifiers 146 at the time of use.

As indicated above, it is possible to access any given storage unit in the memory 114 with an address from "00000" to "19999," and the address for controlling access to the memory 114 is stored in the memory address register 140. In accordance with the present invention, access to and the interchange of information between the computer 102 and the plurality of remote home units, such as the home units 104, 106, is obtained by assigning to the line unit 110 and to the remaining identical line units, such as two additional illustrated line units 158 and 160, addresses in a range outside of the range used to address the memory 114. In the illustrated system, the line units 110, 158, and 160 are assigned addresses greater than "30000." In the illustrated system, eighteen separate line units, such as the line units 110, 158, and 160 are provided, and each of these line units requires ten consecutive five digit addresses for communication in both directions. Thus, each of the line units is assigned an address "30XY0" where XY represents the number of the line unit. Since the eighteen line units are identified by the digital designations 01–18, the address of the line unit 110 (No. 01) is, for instance, "30010." Further, since ten addresses are required for communicating with the line unit 110, the address "30010-30019" provide complete addressing for this line unit. Similarly, the eighteen line unit designated as "18" is fully addressed by the addresses "30180-30189." By thus assigning these addresses to the line units 110, 158, 160, these line units can be accessed by the address register 140 within the operating cycle of the computer 102 and without interference with the addressing of the memory 114.

As indicated above, the computing means 102 provides means for storing binary bits "1," "2," "4," and "8" for each digit in the memory 114 and for transferring these bits throughout the machine. However, the computer 102 is not capable of handling all combinations of these four bits. Accordingly, in the system 100, the line units 110, 158, and 160 are arranged to transfer and receive data on an octal coding basis using only the "1," "2," and "4" bits. This eliminates the necessity of providing "carry" gating in the line units to provide only the combinations of the four binary bits "1," "2," "4" and "8" that can be utilized in the computer 102. As an example, the numerical designations assigned to the home units, such as the home units 104 and 106 are assigned in an octal notation which provides 256 individual decimal designations or combinations in the range between "000" and "377." Using this coding, the binary bits "1," "2," "4" are used for decimal units and tens digits of the station designation and only the bits "1" and "2" for the decimal hundreds digits of the station designation. On this basis, the home unit 104 which is identified by the decimals designation 246 would be identified by the following binary notation when considered from right to left in ascending order: "10100110." In other words, the first three digits on the right represent decimal digit 6, the next three represent the decimal digit 4, and the last two on the left represent the decimal digit 2. This octal coding or a modified form thereof is also used in the line units for storing and transmitting the variable data items received from the home unit.

FIG. 13 of the drawings illustrates the format of the information supplied to and received from each line unit using the binary bits "1," "2," and "4." Since the memory addresses are decremented in the system 100 during the transfer of information between the computer 102 and the plurality of line units 110, 158, and 160, the line unit addresses "30XY9–30XY4" are used to transmit a six digit reply containing the variable items of information previously transmitted from a selected home unit, which data is now stored in a line unit, from this line unit to the computer 102. The first two addresses of the series of addresses of each line unit transmit signals representing channel or line trouble conditions. The address "30XY9" provides a bit on the "1" conductor or bus if there is greater than a seven millisecond discrepancy, during transmission, between what is received and what is sent at the line unit to provide a call check error. A bit on the "2" conductor indicates an open line when a call is attempted by the line unit. At this same address, the presence of a bit on the "4" conductor indicates a received pulse width is out of tolerance to provide a pulse error. At the second address "30XY8," the presence of a bit on the "1" conductor indicates a special call from the fieldman or serviceman. A bit on the "2" conductor indicates no response from the called home unit. A bit on the "4" conductor represents the fact that the call was not proper because of a combination error in the timing format and pulse count.

In the addresses "30XY7" to "30XY4" in the reply from each line unit, information relating to the tuning condition of the remote station is transmitted. At the address "30XY7," the line unit returns a bit on the "1" conductor if the second monitored television receiver at the collaborator's home is in an "off" condition. At the same address, a bit returned on the "2" conductor represents a binary value "8" in the coded designation of the station to which the second television receiver is tuned. The "4" bit at address "30XY7" provides an indication that the connecting cable at the home unit is open. At address "30XY6," the binary conductors "1," "2," and "4" receive bits in accordance with their usual values in the binary coded, decimal designation of the channel or station to which the second television receiver is tuned. At address "30XY5," a bit on the binary "1" conductor represents the fact that the first television receiver in the monitored home is in an "off" condition. The presence of a bit on the binary "2" conductor indicates the fact that the first television receiver in the monitored home includes a binary value "8" in the designation of the channel to which the receiver is tuned. At address "30XY4," the conductors "1," "2," and "4" receive bit marking signals in accordance with normal binary values in the decimal designation of the channel to which the first monitored receiver at the home is tuned. As an example, a six decimal digit reply "002210" represents that second receiver is tuned to channel "10," that the first receiver is "off," and that no faults or special conditions were detected.

The addresses "30XY3–30XY1" are used to address the data sending means in each of the line units to control the transfer of station designation information from the computer 102 to the line unit for subsequent transmission to the home units on the connected channel. At addresses "30XY3" and "30XY2," respectively, the binary conductors "1," "2," and "4" supply correspondingly weighted binary signals representing the decimal units and tens digits of the station designation to be transmitted. At address "30XY1," the "1" and "2" conductors receive bits representing the binary coded decimal value of the hundreds digit of the call station. The "4" conductor receives a bit representing field or service call.

When the line units are addressed "30XY0," bit information is not provided on the "2" and "4" lines, but the presence of a bit on the "1" conductor is used to indicate that the line unit is in a busy condition. More specifically, when a line unit is in the process of sending information to or receiving information from a home unit, any attempt to seize the line unit and to transfer information between this line unit and the computer 102 would result in garbled information. Accordingly, the line unit, such as the line unit 110, supplies a signal to the binary "1" conductor in address "30XY0" to mark the line unit as busy so that the program will not permit the line unit to be seized.

The table in FIGURE 14 of the drawings illustrates a possible sequence of operations in the system 100. Assuming that the system 100 has been in operation, that the line unit 110 has previously transmitted a call to, for instance, the home unit 104, and that the reply information has been received and is now stored in the line unit 110, the point in the program of the computer 102 is reached at which an attempt is to be made to transfer the reply from the line unit 110 to storage in the memory 114 in the computer 102. At this time, the program of the computer 102 transfers a twelve digit instruction from the memory 114 to the memory address register storage 148 and the operation register 156. The operation register 156 stores, for instance, the operation code 43 shown in the first line of the table in FIG. 14 which represents a branch-on digit instruction. One of the registers in the memory address register storage 148 stores a "P" address less than "20000" which represents the address of the storage units in the memory 114 at which a new instruction can be located. Another register in the memory address register storage 148 stores a "Q" address "30010" which is the address at which the line unit 110 is checked for the presence of a busy digit. Following the instruction cycle in which this instruction is transferred from the memory 114 to the memory address register storage 148 and the operation register 156, the computer 102 enters an execution cycle in which the "Q" address "30010" is transferred to the memory address register.

Since this address has a value greater than "20000," the memory 114 is not entered, and the signals applied to the conductors 142 and 144 control the line adapter 112 to address the line unit 110 and, more specifically, the unit therein storing the busy digit. If the reply from the previously interrogated home unit 104 has not been received, the line unit 110 is in a busy state, and the line adapter 112 returns a "1" indicating the busy state of the line unit. Upon receipt of this digit, the computer 102 during a subsequent memory cycle, clears the "Q" address "30010" from the memory address register 140 and enters the "P" address of the instruction which has the value less than "20000." This address now enters the memory 114 and causes the sequential readout on subsequent cycles of the new instruction which is supplied to the operation register 156 and the memory address register storage 148. Typically, this new instruction causes the computer 102 to interrogate another line unit for its idle or busy state.

Assuming, however, that a reply from the home unit 104 has been received and is stored in the line unit 110, a signal is not supplied on the "1" conductor, and the computer 102 is advised that the line unit 110 is in an idle state and can be addressed to supply the desired data items previously received from the home unit 104. The computer 102 now enters an instruction cycle similar to that shown in the second line of the table in FIG. 14 in which a new operation code 26 representing a transfer field instruction is stored in the operation register 156 and new "P" and "Q" addresses are stored in the memory address register storage 148. The stored "P" address, such as "01000," represents the location in the memory 114 in which the first digit of the reply from the line unit 110 is to be stored. The "Q" address "30019" is the address of the line unit 110 in which the first digit of the reply to be transferred is stored. When the instruction cycle has been completed, the computer 102 enters an execution cycle which includes a variable number of memory cycles determined by the number of digits to be transferred. The "Q" address "30019" is read out of the memory address register storage 148 through the amplifiers 146 into the memory address register 140 and is forwarded over the cables 142 and 144 to the line adapter 112. The address appearing on the line 142 is also decremented by one in the control 152 and returned to the memory address register storage 148 as "30018."

Upon receipt of the address "30019" by the line adapter 112, the first digit of the reply from the previously called home unit 104 (see first column in FIG. 13) is transferred through the line adapter 112 and the odd memory buffer register 128 to be stored in the memory data register 134. During the following memory cycle, the "P" address is moved from the memory address register storage 148 through the amplifiers 146 to be stored in the memory address register 140. In the illustrative example, the "P" address "01000" is stored in the register 140 and is effective over the conductors 142 and 144 to address the memory 114 through the matrices 116 and 118 to read out the digit previously stored in the addressed storage unit. The output amplifiers 122 and 124 are selectively inhibited so that the digit stored at the addressed location is cleared from the memory 114. The address "01000" in the register 140 is also decremented in the control 152 and returned through the amplifiers 150 to be stored in the memory address register storage 148 as the address "00999." The digit from the line unit 110 now stored in the memory data register 134 is returned to the even memory buffer register 126 and is read into the storage location addressed as "01000." Thus, the first digit of the reply from the line unit 110 has now been stored in the memory 114.

During subsequent memory cycles, the decremented "Q" address "30018" is presented to the memory address register 140 to read the second digit from the line unit 110 into the memory data register 134 in the manner described above, the "Q" address "30018" being decremented and returned to the memory address register storage as the "Q" address "30017." The decremented "P" address is transferred into the memory address register 140 at "00999" to control the memory 114 in the manner described above so that the digit previously stored therein is cleared to permit the second digit from the line unit now stored in the memory data register 134 to be returned to the memory 114 through the memory buffer register 128.

This operation with the decrementing of the "P" and "Q" addresses continues until such time as the "Q" address "30014" is supplied to the memory address register 140. This causes the return not only of the sixth or last digit of the reply from the line unit 110 but also a flag indicating the end of the field to be transferred. When this sixth or last digit has been transferred into the memory location represented by the decremented "P" address "00995," the execution of the preceding instruction has been completed, and the next instruction cycle is entered in accordance with the program of the computer 102. This next operation can comprise an instruction directing the transmission of a call by the line unit 110 to another one of the home units connected to the signaling channel 108. As an example and as illustrated in the sixth line in FIG. 14, the new instruction which is transferred during the instruction cycle can comprise another transfer field operation code 26 which is stored in the operation register 156 and a pair of "P" and "Q" addresses which is stored in respective registers in the memory address register storage 148. The "P" address, for instance, "30013," represents the address of the line unit 110 for receiving the units digit of the next called station. The "Q" address, for example, "15008" represents the location in the memory 114 at which the units digit of the next call is stored. Assuming that the home unit 106 designated as "127" is to be called, the decimal units digit "7" is stored at the location addressed as "15008" in the memory 114.

Following the transfer of the instruction, the computer 102 enters its execution cycle. In the first memory cycle, the "Q" address "15008" is transferred from the memory address register storage unit 148 to the memory address register 140 and is forwarded over the lines 142 and 144 to control the matrices 116 and 118 and the odd-even control 120 to render the even output amplifier 122 effective to supply a binary coded decimal digit "7," which is the unit digit of the designation of the station 106 to be called, to the even memory buffer register 126. This digit "7" is stored in the memory data register 134 and is also read back into the storage location "15008" through the unit 126. The "Q" address "15008" in the memory address register 140 is also decremented by the control 152 and returned through the amplifiers 150 to the memory address register storage unit 148. The "P" address "30013" at the line unit 110 is then supplied to the memory address register 140. This address has no effect on the memory 114 because of its value, but it is effective through the line adapter 112 to enable storage means in the line unit 110 to receive the first or units digit of the next station to be called. The memory data register 134 storing binary coded decimal digit "7" previously derived from the memory 114 is rendered effective to read this digit through the line adapter 112 to the storage means in the addressed line unit 110. The address "30013" is decremented in the control 152 and returned through the amplifiers 150 to the storage unit 148.

With the units digit of the next called station designation "7" now stored in the line unit 110, the decremented "Q" address "15007" is presented to the memory address register 140 to control the memory 114 to supply the second or tens digit "2" of the called station designation through the odd amplifier 124 and the odd memory buffer register 128 to the memory data register 134. This digit is read back into the memory 114 through the odd buffer register 128 and remains in the memory data register 134 because this register is not reset. The "Q" address "15007" is decremented and stored as "15006" in the memory address register storage 148. The decremented "P" address "30012" is then presented to the memory address register 140 and is effective through the line adapter 112 to enable the tens digit storing unit in the line unit 110. The memory data register 134 transfers the tens digit "2" of the next station to be called to the line unit 110 for storage therein.

The "P" address is decremented to "30011" and returned to the memory address register storage unit 148.

During succeeding memory cycles, the decremented "Q" address "15006" and "P" address "30011" transfer the hundreds digit "1" of the called station address to the line unit 110 in the manner described, this digit also being read back into the memory 114 to preserve this digit for subsequent use. A flag bit at the "Q" address "15006" terminates the transfer field instruction, and the computer 102 proceeds with the next instruction in the stored program. Following the completion of the storage of all three digits of the called station designation "1," "2," and "7" in the line unit 110, this line unit transmits the designation over the signaling channel 108 to all of the home stations, including the home units 104 and 106, connected to this channel. Since this transmitted address is individual to the home unit 106, only this unit responds and transmits its variable data items back over the channel 108 to the line unit 110 for storage therein. This takes place during the interval in which the computer 102 is receiving variable data items from and transmitting subsequent calls to other home units connected to others of the line units, such as the line units 158 and 160.

When the point in the stored program of the computer 102 is reached at which the information previously returned from the home unit 106 to the line unit 110 is to be transferred to the memory 114 in the computer 102, the computer program again causes an instruction to be transferred from the memory 114 to the address storing means in which the branch-on digit operation code 43 is stored in the operation register 156, the "Q" address "30010" of the busy digit of the line unit 110 is stored in one of the registers in the memory address register storage unit 148, and a "P" address less than "20000" is stored in the register storage unit 148. The computer 102 then checks the busy or idle status of the line unit 110 to determine whether the reply has been received. If the line unit is in an idle condition, the computer 102 clears the previous instruction and supplies a new instruction including a transfer field operation code 26 to the operation register 156 and corresponding "P" and "Q" addresses to the related registers in the register storage unit 148. The stored "Q" address is again the address "30019" of the first digit of the reply stored in the line unit 110.

However, since the information now stored in the line unit 110 is from a different home unit than the previous reply stored during the operations shown in lines 2–5 of the table in FIG. 14, the "P" address now in the register storage unit 148 (00756) is that of the location in the memory 114 at which the data received from the previously called station 127 or home unit 106 is to be stored. As illustrated in line 9 of the table in FIG. 14, these "P" addresses can be, for instance, "00756–00751." The computer 102 now decrements the "Q" and "P" addresses and transfers the digits stored in the line unit 110 to the storage locations in the memory 114 assigned to the variable data items from the home unit 106.

These operations are continuously performed at timed intervals so that calls are periodically transmitted to all of the home units in the system 100 and variable data items from all of these home units are returned to the computer 102 to form a basis on which a rating can be established. The stored program for the computer 102 cannot only include the representative operations described above involving the transmission of calls to and the receipt of data items from the home units but also any arithmetical and other operations necessary to continuously establish and store or record ratings based on the information derived from the home units. In this manner, the information or facts on which the rating is based are automatically collected and directly returned to the computer on a real time basis.

The details of the data handling system 100 embodying the present invention are illustrated in FIGS. 7–11 by the use of logic diagrams in which the various circuit components are shown in logic schematic form. In the logic diagrams, these circuit components, such as a flip-flop, are represented by a particular logic symbol. The logic symbols and typical circuit arrangements represented by the logic symbols for certain of the components shown in FIGS. 7–11 are illustrated in FIGS. 2–6 of the drawings. Each of these figures includes both an illustration of the logic symbol and a typical circuit represented by the symbol. Although the illustrated representative circuits are conventional in design and well known in the art, a brief description of certain of the circuits is set forth below.

The logic symbol for a "NOR" gate is illustrated in FIG. 2A, and a typical circuit for this "NOR" gate is illustrated in FIG. 2B. Whenever a more negative potential is applied to any one of a plurality of input terminals $a$, $b$, or $c$, a more positive signal approaching ground is provided at an output terminal $d$. The "NOR" gate includes a transistor 200 whose collector is connected to a nominal negative potential of twelve volts through a resistor 202. The emitter of the transistor 200 is returned to ground potential, and the base is connected to a nominal twelve volt positive potential through a resistor 204. The base is also connected to the input terminals $a$, $b$, and $c$ through three series resistors 206, 208, and 210, respectively.

Whenever one of the terminals $a$, $b$, or $c$ is connected to a more negative potential, the base of the transistor 200 is biased negative with respect to its emitter, and this transistor is placed in a conductive condition so that a potential approaching ground is applied to the output terminal $d$. Alternatively, when all of the input terminals $a$, $b$, and $c$ are returned to a potential approaching ground, the base of the transistor 200 is biased positive with respect to its emitter, and this transistor remains in a nonconductive condition to apply a more negative potential to the output terminal $d$. In the circuit diagram shown in FIGS. 7–11, the "NOR" gate shown in FIG. 2 can be provided with any number of inputs. Further, in certain applications, the collector load 202 for the transistor 200 is not provided. In these instances, a dot is disposed within the generally semicircular outline of the logic symbol for the "NOR" gate shown in FIG. 2A.

A logic symbol for a "NAND" gate is shown in FIG. 3A of the drawings, and a typical circuit for this "NAND" gate is illustrated in FIG. 3C. Whenever all of a plurality of inputs $a$, $b$, and $c$ to the "NAND" gate are returned to a more negative potential, a more positive potential approaching ground is applied to an output terminal $d$.

The "NAND" gate includes a transistor 300 whose collector is connected to a negative potential through a resistor 302. The emitter of the transistor 300 is returned to ground potential, and the base of the transistor is connected to a voltage dividing network including three resistance elements 304, 306, and 308 connected in series between positive and negative potentials. Whenever any one of the input terminals $a$, $b$, or $c$ is placed at ground potential, the point of common connection of the resistance elements 304 and 306 is returned to substantially ground potential, and the base of the transistor 300 is maintained at a positive potential relative to its emitter. This maintains the transistor 300 in a nonconductive condition so that a more negative potential is applied to the output terminal $d$.

However, when all of the input terminals $a$, $b$, and $c$ are returned to a negative potential, the three individually associated diodes 310, 312, and 314 are all biased in a reverse direction, and the voltage dividing network including the resistance elements 304, 306, and 308 maintains the base of the transistor 300 negative with respect to its emitter. This places the transistor 300 in a conductive condition so that the output terminal $d$ is placed substantially at ground potential. If the collector load resistance 302 is removed from the "NAND" gate, a dot is placed in the generally semicircular outline of the logic symbol shown in FIG. 3A. This gate is used with varying numbers of inputs in the circuit diagram shown in FIGS. 7–11.

A modified form of the "NAND" gate circuit illustrated in FIG. 3C is also used in the circuit diagram to provide an inverter which is represented by the logic symbol shown in FIG. 3B. More specifically, the "NAND" circuit is provided with only the single input $a$. Accordingly, whenever a negative-going signal is applied to the terminal $a$, a diode 310 is biased in a reverse direction, and the transistor 300 is placed in a conductive condition to deliver a positive-going signal at the output terminal $d$. As in the case of the "NAND" gate logic symbol shown in FIG. 3A, the absence of the collector load resistance 302 in the inverter is represented by the presence of a dot within the generally triangular outline of the symbol shown in FIG. 3B.

FIG. 4A illustrates a logic symbol for a control flip-flop, and FIG. 4B illustrates a typical circuit diagram for the flip-flop. The circuit shown in FIG. 4B includes a pair of transistors 400 and 402 whose collector electrodes are connected to a source of negative potential through a pair of resistance elements 404 and 406. The bases and collectors of the two transistors 400 and 402 are cross-coupled through a pair of resistance elements 408 and 410 which are returned to a positive potential through a pair of resistance elements 412 and 414.

When a positive-going signal is applied to a set input terminal $a$, this signal is coupled through a capacitor 416 and a diode 418 to be applied to the base of the transistor 400. This places the base of the transistor 400 at a positive potential with respect to its grounded emitter and places this transistor in a nonconductive condition so that a more negative potential is applied to a reset output terminal $c$. When the transistor 400 is placed in a nonconductive condition, a more negative potential is applied to the base of the transistor 402 so that this transistor is placed in conductive condition to apply a more positive potential approaching ground to a set output terminal $d$. Conversely, when a positive-going pulse or signal is applied to a reset input terminal $b$, this signal is coupled through a capacitor 420 and a diode 422 to drive the base of the transistor 402 positive with respect to its grounded emitter. This places the transistor 402 in a nonconductive condition so that a more negative potential is applied to the set output terminal $b$. This more negative potential places the transistor 400 in a conductive condition so that a more positive potential approaching ground is applied to the reset output terminal $c$. Thus, the application of a more positive pulse to one of the set or reset inputs produces a corresponding more positive state output on the corresponding output terminal.

In the logic diagram shown in FIG. 4A, the inputs are represented by lead lines to which arrowheads are applied, and the outputs are represented by only lead lines. In the circuit diagram of FIGS. 7–11, the arrangement of the input and output lines relative to the square of the logic symbol is varied, and, in some instances, not all of these lines are used or shown. Further, the normal output lines $c$ and $d$ are sometimes used as inputs as well as outputs. When a ground or a negative input is applied to one of the terminals $c$ or $d$, the flip-flop is set to a condition in which this same polarity signal is provided as an output when the input to the terminal $c$ or $d$ is removed.

The logic symbol for a flip-flop used in binary counters and shift registers is illustrated in FIG. 5A, and a typical circuit for this flip-flop is illustrated in FIG. 5B. The counting flip-flop comprises a bistable circuit including a pair of transistors 500 and 502 that are alternately placed in conduction. The emitters of the transistors 500 and 502 are connected to a source of reference potential, such as ground, and the collectors thereof are cross-coupled with their base electrodes. The flip-flop includes both a pair of enabling inputs $a$ and $b$ which are alternately or selectively supplied with a potential near ground or a negative potential and a shift pulse input terminal $c$ for coupling positive-going pulses through a pair of capacitors 504 and 506 and a pair of diodes 508 and 510 to the base electrodes of the transistors 500 and 502. A set output terminal e is returned substantially to ground potential when the transistor 502 is placed in conduction and drops to a more negative potential when the transistor 502 is placed in a nonconductive condition. A reset output terminal f is provided with signals of an opposite polarity relative to the terminal e under the control of the conductive or nonconductive state of the transistor 500. A reset input terminal d, when supplied with a more negative potential, places the transistor 500 in a conductive condition and the transistor 502 in a nonconductive condition. This places the flip-flop in a normal or reset state in which ground is applied to the reset terminal f and a more negative potential is applied to the set terminal e.

When the flip-flops shown in FIG. 5B are to be connected as a shift register, the input enabling terminals a and b of one stage or flip-flop are coupled to the output terminals e and f of the flip-flop in a preceding stage so that when ground potential is applied to the terminal a, a negative potential is applied to the terminal b. These potentials bias the diode 510 in the given stage in a reverse direction and bias the diode 508 in the given stage in a forward direction. Thus, when a positive-going shift pulse is applied to the shift input terminal c, it is forwarded through the diode 508 to place the transistor 500 in a nonconductive state. This, in turn, places the transistor 502 in a conductive state. The application of additional input or shift pulses to the terminal c does not change the state of the flip-flop until the enabling potentials applied to the terminals a and b are reversed. When these potentials are reversed, the next pulse applied to the input terminal c places the transistor 502 in a nonconductive condition to return the transistor 500 to a conductive condition.

The flip-flop shown in FIG. 5B can also be connected to provide a binary counting chain rather than a shift register. To connect a group of the flip-flops in a binary counting chain, the terminals a and f in each stage are connected together, and the terminals e and b are connected together. The terminal f in a given stage is coupled to the terminal c in the next higher stage. The terminal c in the lowest order stage is coupled to the source of pulses or signals to be counted. Because of the interconnection of the terminals a, f and e, b in the individual stages, alternate ones of the pairs of coupling capacitors 504 and 506 are rendered effective to deliver positive-going pulses through the diodes 508 and 510 to the base electrodes of the transistors 500 and 502. In this manner, the plurality of flip-flops can be connected to provide a binary counting chain.

In the logic symbols shown in FIG. 5A, the reset and set output terminals f and e, respectively, are shown as lead lines. The shift or counting pulse input terminal c includes an arrowhead and is disposed substantially midway along the gate side of the rectangle forming the logic symbol. The reset input b also includes an arrowhead and is aligned with the reset output. In the circuit diagram, the relative positions of the lead lines representing the terminals c, d, e and f can be varied.

FIGS. 6A and 6B illustrate, respectively, a logic symbol for a typical circuit of a monostable multivibrator. In the circuit shown in FIG. 6B, a transistor 600 is normally in a nonconductive condition, and a transistor 602 is normally in a conductive condition. Thus, ground potential is normally supplied to an output terminal a, as indicated by the shaded portion of the logic symbol in FIG. 6A, and a more negative potential is applied to an output terminal c, as indicated by the unshaded portion of the logic symbol in FIG. 6A. When a positive-going signal is applied to an input terminal b, this signal is forwarded through a diode 604 to be applied to the base of the transistor 602. This drives the base of this transistor positive with respect to its emitter, and the transistor 602 is placed in a nonconductive condition. Thus, the potential at the output terminal a drops to a more negative value. Further, when the transistor 602 is placed in a nonconductive condition, a more negative potential is applied to the base electrode of the transistor 600 from a voltage dividing network connected to its base. This places the transistor 600 in a conductive condition. Thus, the potential at the output terminal c rises from a more negative potential toward ground potential.

In the normal condition of the monostable circuit shown in FIG. 6B, a capacitor 606 is charged substantially to the negative supply potential. When the transistor 600 is placed in a conductive condition, one terminal of the capacitor 606 is clamped at ground potential, and the potential to which this capacitor is charged biases a diode 608 in a reverse direction so that the base of the transistor 602 is maintained at a positive potential to hold this transistor in a nonconductive condition. The charge on the capacitor 606 discharges over an interval determined by the RC constants of the connected network. When the charge on the capacitor 606 is suitably dissipated, the diode 608 is no longer biased in a reverse direction and is placed in a conductive condition so that the base of the transistor 602 is again placed at a negative potential relative to its emitter. The transistor 602 now returns to a conductive condition and places the transistor 600 in a nonconductive condition so that the normal output potentials are applied to the terminals a and c. In the schematic circuit diagrams in FIGS. 7-11, the delay time of each monostable circuit is indicated in the unshaded upper portion of the logic symbol.

The operation of the system 100 shown in detail in FIGS. 7-11 of the drawings is described below with reference to a group of representative operations of this system. The description of the operation of the system begins at a point at which the computer 102 has previously transmitted the individual designation "246" of the home unit 104 through the line adapter 112 and the line unit 110 to be applied over the signalling channel 108 to all of the home units of this channel including the home units 104 and 106. The home unit 104, upon detection of its individual designation "246," transmits its variable data reply over the channel 108 to the line unit 110 to be stored therein.

More specifically, this reply information is stored in a shift register 840 (FIG. 8), and related information such as that relating to the condition of the signaling channel 108 is stored with a plurality of other components in the line unit 110 (FIGS. 7-10). This stored information partially and selectively enables an output means 930 consisting of a set of "NAND" gates 931-949. When all of the information in the reply has been received from the previously interrogated home unit 104, the line unit 110 is returned from a busy condition to an idle condition. The idle condition of the line unit 110 is stored by placing a bistable circuit including a pair of cross-connected "NAND" gates 876 and 878 in a reset condition in which the output of the gate 876 provides ground potential. This output is forwarded to one input of the gate 878, the other two inputs of which are at ground, to hold its output, which is connected to one input of the gate 876, at a more negative potential. The more positive or ground output from the gate 876 is also applied to one input of the "NAND" gate 931 and inhibits this gate to indicate that the line circuit 110 is in an idle condition.

Assuming that the reply from the previously interrogated home unit 104 indicates that the line is in a satisfactory condition, that the second television receiver in the home containing the unit 104 is on and tuned to channel "9," and that the first television receiver in the home containing the unit 104 is in an "off" condition, this information is now stored in the unit 110 and serves to selectively enable or inhibit the gates 932-949. More specifically, the gate 947 has ground potential applied to an input terminal "C" indicating that a call check error was not present. An input "0" to the gate 948 is supplied with ground potential to indicate that an open line was not encountered. An input "P" to the gate 949 is provided with a ground inhibiting potential to indicate that a pulse error was not detected. An input "FM" to the gate 944 is provided with a ground inhibiting potential indicating that the call was not one relating to a field or service call. An input "NR" to the gate 945 is provided with a ground inhibiting potential to indicate that there was not a "no response" error. An input "OK" to the gate 946 is provided with a ground inhibiting potential to indicate that the call was not "OK" and therefore was proper or "OK."

To store the fact that the second television receiver in the monitored home was in an on condition, a ground inhibiting potential is applied from the shift register 840 to a terminal "6R" of the gate 941 to indicate that this receiver was not "off." Since the channel to which the second receiver is tuned is designated as "9" and since this designation is represented by the binary bits "8" and "1," a more negative enabling potential is applied to an input terminal "2R" of a gate 942. Since the cable between the home unit and the receiver was not open, a ground inhibiting potential is applied to an input terminal "1R" of the gate 943. The second bit of the "9" designation of the tuning condition of the second receiver is "1" and accordingly, a negative enabling potential is applied to a terminal "5R" of the gate 938. Since the binary bits "2" and "4" are not used in the coded designation of the selected channel "9," ground inhibiting potentials are applied to an input terminal "4R" to the gate 939 and the terminal "3R" to the gate 940.

Since the first television receiver in the home is in an "off" condition, a negative enabling potential is applied to a terminal "11R" of the gate 935. Since the first receiver is in an "off" condition, a ground inhibiting potential is applied to a terminal "7R" of the gate 936 representing the binary bit "8" of the coded designation of the tuning condition of the first receiver. As illustrated in FIG. 13, the "4" bit position at address "30XY5" is not used, and one input to the gate 937 is strapped to ground to permanently inhibit this gate. Further, since the first television receiver in the monitored home is in an "off" condition, the binary bits "1," "2," and "4" of the designation of the tuning condition of this receiver are not used, and the terminals "10R," "9R," and "8R" are provided with ground potentials to inhibit the gates 932, 933, and 934, respectively.

The outputs of the gates 931, 932, 935, 938, 941, 944, and 947 are connected to a binary bit "1" bus or conductor (see FIGS. 9 and 13) which extends over a cable 980 which is common to all of the line units, such as the units 158 and 160 (FIG. 1), to an input inverter 1031 (FIG. 10) in the line adapter 112. Similarly, the gates 933, 936, 939, 942, 945, and 948 are connected to a binary bit "2" bus which extends over the cable 980 to an input inverter 1032 in the line adapter 112. The gates 934, 937, 940, 943, 946, and 949 are connected to a binary bit "4" bus which extends over the cable 980 to an input inverter 1033 in the line adapter 112. In this manner, the output means 930 in the line unit 110 and a similar output means in the remaining line units are coupled over the cable 980 to an input to the line adapter 112.

Each of the line units, such as the line units 110, 158, and 160, also includes an input means for receiving the station designating signals from the computer 102 through the line adapter 112. In the illustrated line unit 110, an input means 900 is provided including nine "NAND" gates 901–909. The outputs of the gates 901–908 are connected to the correspondingly designated input-output terminals of the shift register 840 to provide means for storing station designations received from the computer 102 in the shift register 840. The gates 906–908 store the "4," "2," and "1" bits of the units digits of the station designation in the shift register 840. The gates 903–905 store the "4," "2," and "1" bits, respectively, of the tens digits of the station designation in the register 840. The gates 901 and 902 store the "2" and "1" bits of the hundreds digits of the station designation in the register 840 (see FIG. 13). The gate 909 is used to provide the extra bit to designate a call to a fieldman.

One input of each of the gates 902, 905, and 908 is connected to the output of an inverter 910 whose input is connected to a "1" bus in a cable 1090 which extends to the adapter 112 and over which digital information is transferred from the adapter 112 to the line unit 110, the cable 1090 being common to all of the line units in the system. Similarly, one input to each of the gates 901, 904, and 907 is connected to the output of an inverter 912, the input of which is coupled to a binary bit "2" bus in the cable 1090. One input to each of the gates 903, 906, and 909 is connected to the output of an inverter 914, the input of which is connected to a binary bit "4" bus extending over the cable 1090 to the adapter 112. The cable 1090 also includes a write bus, the input of which is connected to an inverter 916 in the line unit 110.

In this manner, the output data cable 980 and the input data cable 1090 which are common to all of the line units 110, 158, and 160 interconnect these line units with the line adapter 112 to transfer data between these components and the computer 102. As indicated above, the line units are each provided with an individual designation or group of designations which permits only a selected one of the line units to be effective to control the transfer of information between these line units and the line adapter 112. The line unit 110 is designated as the "01" line unit. Further, since the line units are addressed as "30XY0–30XY9" in which "XY" is the number of the line unit, the line unit 110 is addressed by the addresses "30010–30019." The line unit 110 is rendered responsive to this particular group of addresses by a pair of adjustable switch means 994 and 998 which are adjusted to positions representing the value of the "X" and "Y" digits of the address or line unit designation, respectively.

More specifically, the "X" switch 994 is adjusted to a position representing the "X" digit "0" to connect the input of an inverter 992 to a "0" bus extending over an address cable 1154 to the line adapter 112, the cable 1154 being common to all of the line units. Similarly, the "Y" switch 998 is adjusted to a position representing the value "1" of the "Y" digit in the designation of the line unit 110 to couple the input of an inverter 996 to a "1" bus in a group of ten address conductors extending over the address cable 1154 to the adapter 112. The line unit 110 and the remaining line units, such as the units 158 and 160, are also coupled to the line adapter 112 over a units digit address cable 1164 containing ten units digit buses representing "1–9" and "0." These buses are connected to the inputs of ten inverters 922 in the line unit 110 and to similar inverters in the remaining line units.

With the reply from the home unit 104 now stored in the line unit 110 and with a variable number of other programmed operations of the computer 102 being completed, the time is reached at which the data reply from the home unit 104 now stored in the line unit 110 is to be transferred through the line adapter 112 to the designated position in storage 114 in the computer 102. As set forth above in the general description, this transfer of the reply to the storage unit 114 in the computer 102 cannot be accomplished unless the line unit 110 is in an idle condition indicating that the reply has been completed. This is done by checking for the presence of a busy digit using, for instance, a branch-on digit operation code, such as the operation code "43." When this operation is to be performed, the instruction is transferred at the operation register 156 (FIG. 1), the relevant "P" and "Q" addresses are transferred to the memory address register storage 148, and the relevant "Q" address is presented in the memory address register 140. Since the busy digit for the line unit 110 is stored or is accessed through the address "30010," this address is stored in the memory address register 140.

When this "Q" address is stored in the memory address register (MAR) 140, a combination of ground and negative signals are forwarded over the cable 142 to a group of input terminals 1116, 1118, 1120, 1138, and 1140 (FIG. 11) in the line adapter 112. More specifically, the terminals 1140 receive signals representing the units digit "0," the terminals 1138 receive binary coded signals representing the tens digit "1," the terminals 1120 receive binary coded digits representing the hundreds digit "0," the terminals 1118 receive binary coded signals representing the thousands digit "0," and the single terminal 1116 receives a positive going signal representing the fact that the address has a value equal to or in excess of "20000."

Referring now more specifically to the unit address digit terminals 1140, the terminal designated as "1" receives a positive-going signal when a binary bit "1" is present in the coded designation of the value of the units digit, and the terminal designated "$\overline{1}$" receives a negative-going signal, if the "1" bit is present in the signal. The terminals designated as "2," "4," and "8" similarly receive positive-going signals if the related binary bit is present, and these signals are inverted in three inverters 1144 to provide negative-going signals when the corresponding bit is present. These signals are forwarded over a cable 1146 to a units digit translating or binary to decimal decoding network 1160 including a plurality of "NAND" gates 1162, the outputs of which are couped through individual emitter followers 1166 to the corresponding decimal buses in the cable 1164 extending to all of the line units. The inputs to the "NAND" gates 1162 are so arranged that a single one of these gates is fully enabled in accordance with the value of the input digit received from the memory address register 140.

In the assumed illustrative example set forth above, the value of the units digit of the address for the busy test is "0." Accordingly, the gate 1162 connected to the "0" conductor in the cable 1164 is fully enabled, and the connected emitter follower 1166 forwards a positive-going pulse over the conductor in the cable 1164 to the connected inverter 922 in the line unit 110 and all of the other line units. This places the connected "0" inverter 922 in a non-conductive condition so that a negative enabling potential is applied to the right-hand input of the gate 931. This more negative signal is also applied to the right-hand input of the gate 878. The center input to the gate 931 is inhibited by the application of a ground potential from the output of the gate 876 if the line unit 110 is in an idle condition. Alternatively, this center input to the gate 931 is enabled by a negative potential from the gate 876 if the line unit 110 is in a busy condition.

The tens address digit input terminals 1138 in the line adapter 112 receive input signals similar to those applied to the terminals 1140, and these signals are forwarded either directly or through four inverters 1142 to a tens digit translating or decoding network 1150 over the cable 1146. The tens digit translating network 1150 includes a plurality of "NAND" gates 1152 whose outputs are connected to the tens address digit conductors in the cable 1154 through individually connected emitter followers 1156. The inputs to the "NAND" gates 1152 are so arranged that only a single one of the ten gates is fully enabled in accordance with the digit represented by the binary coded signals applied to the input terminals 1138. In the assumed example, the value of the tens digit of the address is "1," and the upper left-hand gate 1152 in the network 1150 is fully enabled to forward a positive-going signal through its connected emitter follower to the "1" bus in the cable 1154.

This more positive-going signal is forwarded through the switch 998 which is connected to the "1" bus in the cable 1154 to be applied to the input of the inverter 996. This positive-going signal places the inverter 996 in a nonconductive condition. When the inverter 996 is placed in a nonconductive condition, a common address enabling conductor 997 will drop to a more negative potential only if the inverter 992 is concurrently placed in a nonconductive condition, the two inverters 992 and 996 sharing a common output load or collector resistance. Since the tens address digit conductors are common to all of the line units, the inverters similar to the inverter 996 in any of the line units having the tens digit "1" in their address are similarly placed in a nonconductive condition.

The hundreds address digit terminals 1120 in the line adapter 112 receive similar binary coded signals representing the value of the hundreds digit of the address stored in the memory address register 140. These signals are forwarded either directly or through two inverters 1128 and 1130 to two inputs of three translating gates 1122, 1124, and 1126, the outputs of which are coupled through three emitter followers 1132, 1134, and 1136 to three hundreds address digit conductors representing "0," "1," and "2," respectively, in the cable 1154. The inputs to the three gates 1122, 1124, and 1126 are such that these gates are respectively enabled when the value of the hundreds digit of the address is "0," "1," or "2." However, these gates are not fully enabled by signals applied to the hundreds digit input terminals 1120 but are coupled to means controlled by the values of the thousands and ten thousands digit to provide an output only when these digits fall within the range of values assigned to the line units.

More specifically, and since the value of the thousands digit in the addresses of all of the line units is "0," all four of the thousands digit input terminals 1118 receive negative-going signals when a line unit is addressed. These signals enable a "NAND" gate 1112 to place an inverter 1114 in a nonconductive condition. Since a ground pulse is present at the ten thousands digit terminal 1116, an inverter 1110 is also placed in a nonconductive condition. The inverter 1110 and another inverter 1108 share a common output load with the inverter 1114. Accordingly, the third input to each of the gates 1122, 1124, and 1126 is dropped to a negative enabling potential only when all three of the inverters 1108, 1110, and 1114 are placed in a nonconductive condition. The inverters 1110 and 1114 are placed in a nonconductive condition in the manner described above because the value of the ten thousands and thousands digits of the address presented by the memory address register 140 is in the range assigned to the line unit. The conductivity of the inverter 1108 is controlled by a signal applied to a read input terminal 1103.

More specifically, this terminal receives a positive-going signal a time after the address signals from the memory address register 140 are presented to the address input terminal. When the positive-going signal is applied to the terminal 1103, the input of an inverter 1106 is placed substantially at ground potential, and the inverter 1106 is placed in a nonconductive state so that a more negative potential is applied to the input of an inverter 1104. This places the inverter 1104 in a conductive condition and latches the potential supplied by the terminal 1103 near ground potential. When this near-ground potential is applied to the input of the inverter 1108, this inverter is placed in a nonconductive condition, and the third input of each of the three decoding gates 1122, 1124, and 1126 is enabled.

Since the value of the hundreds digit of the address presented by the memory address register 140 is "0", the inverter 1132 places the "0" bus in the cable 1154 near ground potential, and this signal is forwarded over the cable 1154 and applied over the switch 994 to the input of the inverter 992. This places the inverter 992 in a nonconductive condition and drops the potential on the common enabling conductor 997 to a more negative value. This conductor is connected to one input of each of the gates 901–909 and 931–949 in the line unit 110. Further, since the line unit 110 is the only line unit designated by the combination of "XY" digits of "01," the common enabling conductor 997 in only the single line unit 110 is at a negative enabling level.

During the interval in which the "Q" address associated with the branch-on digit operation code is set up in the memory address register 140 and preceding the time at which the enabling or read pulse is applied to the terminal 1103 in the manner described above, a digit register 1010 in the line adapter 112 is reset or cleared to remove any information previously stored therein and to condition this register for use. The register 1010 which includes six control or storage flip-flops 1011–1016 for storing binary bits "1," "2," "4," "8," a parity or check bit, and a flag bit, respectively, receives a digit from a line unit for transmission to the computer 102 or a digit from the computer 102 for transmission to one of the line units. When the register 1010 is to be cleared, a positive-going pulse is applied to a terminal 1048 and is coupled through an emitter follower 1049 to be applied to the reset inputs of the flip-flops 1011–1016. This places all of these units in a condition in which a more negative potential is applied to two sets of data output terminals 1002 and 1004 which are connected to the even memory buffer register 126 and the odd memory buffer register 128, respectively. To provide signals consistent with those used in the illustrated computer 102, a stage of inversion can be provided between the set outputs of the storage flip-flops 1011–1016 and the connected terminals so that in the reset condition of the register 1010, more positive or ground signals are applied to the data output terminals 1002 and 1004. Thus, the register 1010 is reset to a normal condition prior to the time at which the selection of the line unit 110 is completed.

When the two inverters 992 and 996 are placed in a nonconductive condition in the manner described above, the common address enabling conductor 997 drops to a more negative potential to partially enable all of the gates in the input means 900 and the output means 930 in the selected line unit 110. Since the "0" conductor in the cable 1164 places the connected inverter 922 in a nonconductive condition in the manner described above, the left-hand and the right-hand input to the busy gate 931 are enabled. If the line unit 110 is in a busy condition, the gate 876 provides a negative potential to the center input of the gate 931, and the output of this gate applies a positive-going signal over the "1" bus in the cable 980 to the input of the inverter 1031 in the line adapter 112. This places the inverter 1031 in a nonconductive condition so that the left-hand input of a gate 1021 connected to the "1" storage flip-flop 1011 is enabled. Since no other signals are returned from the selected line unit 110 to the adapter 112 at this time, four inverters 1032–1034 and 1036 remain in a conductive condition to apply an inhibiting input to the left-hand inputs of four gates 1022–1024 and 1026 connected to the set input-output terminals of the storage flip-flops 1012–1014 and 1016. The set input-output terminals of the parity or check bit flip-flop 1015 is connected to the output of a gate 1025 whose left-hand input is connected to an exclusive "OR" gate 1044. The exclusive "OR" gate 1044 together with three additional exclusive "OR" gates 1041–1043 are connected to the "1," "2," "4," and flag inputs to provide a conventional parity check circuit 1040 designed to insure an odd number of bits in each digit. Since only the input to the "1" inverter 1031 is receiving a more positive signal, thus providing odd parity, the exclusive "OR" gate 1044 applies an inhibiting potential to the left-hand input of the gate 1025.

The center inputs to the six gates 1021–1026 are connected to the output of an inverter 1051, the input of which is connected to the output of a "NAND" gate 1052. With a branch-on digit operation being performed, a pair of terminals 1056 and 1058 provide negative enabling potentials to the upper and lower inputs of the gate 1052 to partially enable this gate. The center input to the gate 1052 is connected to the output of an inverter 1102 which is held in a non-conductive condition when the positive-going signal is supplied by the inverter 1104. Thus, the gate 1052 is completely enabled and provides a more positive output signal that holds the inverter 1051 in a nonconductive condition so that an enabling potential is applied to the center input of each of the gates 1021–1026.

At the point in time following the presentation of the digit representing signals to the inputs of the gates 1021–1026 from the selected line unit 110, a positive-going strobe signal is applied to a terminal 1054 from the computer 102. This signal places an inverter 1050 in a nonconductive condition to apply an enabling signal to the right-hand inputs of the gates 1021–1026. Since only the gate 1021 is fully enabled because of the presence of the "1" bit representing the assumed busy condition of the line unit 110, the output of only the gate 1021 rises to a more positive potential to switch the flip-flop 1011 to its alternate conductive state in which a more positive potential is provided at the set output terminal. The outputs of the remaining flip-flops 1012–1016 provide negative potentials at the set output terminals. This binary coded combination representing a busy condition is applied to the MBR's 126 and 128 and is detected in the computer 102 to provide an indication that the line unit 110 is busy. Since a branch-on digit operation is being performed, the computer 102 now looks to the "P" address of the branch-on digit instruction to find the address of the next instruction to be performed. The reply from the line unit 110 cannot be contained at this time because of the busy condition of the line unit. The computer 102 then performs subsequent steps in its program.

Assuming, on the other hand, that the line unit 110 is in an idle condition when the common address enabling bus 997 in the line unit 110 drops to a more negative potential, the gate 931 is inhibited by the gate 876, and a positive-going pulse is not supplied over the "1" bus in the cable 980 to the input of the inverter 1031. If none of the conductors in the cable 980 provides a more positive signal, the parity check circuit 1040 controls the exclusive "OR" gate 1044 to apply a negative enabling potential to the gate 1025. Thus, when the strobe pulse is provided by the inverter 1050, the flip-flop 1015 is operated to its alternate state to supply a ground output at its set output terminal. This signal is forwarded over the lines connected to the terminals 1002 and 1004 to the odd and even memory buffer registers 126 and 128 to advise the computer 102 that the addressed line unit 110 is in an idle state in which a reply from the previously interrogated home unit can be transmitted to and stored in the memory 114 of the computer. This means that a branching in the program is not performed.

Accordingly, the computer 102 now presents the next instruction, and, as illustrated in FIG. 14, causes a transfer field operation code, such as "26" to be stored in the operation register 156 in conjunction with the "Q" address "30019" at which is stored the first reply digit in the line unit 110 and the "P" address, for instance "01000," of the location in the memory 114 at which this first reply digit is to be stored. At the completion of the instruction cycle in which these operations are performed, the computer 102 enters a first memory cycle of the related execution cycle and presents the "Q" address "30019" to the memory address register 140. Since this address is above values assigned to the memory 114, it does not affect the memory unit in the computer 102. However, this address is also forwarded over the cable 142 to the line adapter 112 and provides virtually the same pattern of potentials on the terminals 1116, 1118, 1120, and 1138 as described above when the line unit 110 was previously addressed to determine its idle or busy status. However, the signals supplied to the terminals 1140 now provide a binary coded designation of a units digit "9" rather than "0." Thus, the gate 1162 in the decoding or translating network 1160 connected to the emitter follower 1166 coupled to the "9" conductor in the cable 1164 receives a positive-going signal to place the inverter 922 in the line unit 110 connected to this conductor in a non-conductive state. During the interval in which this address is set up in the adapter 112, the pulse applied to the terminal 1048 in the adapter 112 clears the register 1010 in the manner described above. The gates 1021–1026 are all inhibited at this time because of the disappearance of the enabling signals from the terminals 1054, 1056, and 1058 which appear only for fixed time intervals during each memory cycle.

When the common address enabling bus 997 and the output of the inverter 922 connected to the "9" conductor in the units digit cable 1164 both drop to a negative potential, the right-hand and left-hand inputs of the three gates 947–949 addressed by the address "30019" are enabled. In the illustrative example set forth above, a call check error, an open line, and a pulse error were not present. Thus, the terminals designated as "C," "O," and "P" have ground inhibiting potentials applied thereto, and none of the three gates 947–949 is fully enabled. Thus, the "1," "2," and "4" conductors in the cable 980 remain at a more negative potential to hold the inverters 1031–1033 in a conductive condition applying an inhibiting potential to the left-hand input of the three gates 1021–1023 in the adapter 112. The parity check or parity bit generator 1040 is also controlled by these inputs to apply a more negative enabling potential to the left-hand input of the gate 1025. Accordingly, when the terminals 1054, 1056, and 1058 receive their input signals and since the address has a value equal to or greater than "20000," the inverters 1050 and 1051 are placed in nonconductive conditions to enable the two right-hand leads to each of the gates 1021–1026. When this happens, only the check or parity bit flip-flop 1015 is operated to a condition in which ground is applied to the set output terminal. This pattern of ground and negative potentials representing the satisfactory line conditions described above is transferred through the MBR's 126 or 128 to be stored in the memory data register 134 in the computer 102. Toward the end of this first memory cycle in the execution cycle of the transfer field operation, the enabling potentials referred to above are removed, and the address from the memory address register 140 is removed. The "Q" address "30019" in the memory address register 140 is decremented to "30018" and returned to the memory address storage unit 148.

The second memory cycle in the transfer of the first digit in the field is then initiated, and the "P" address identifying the location in the magnetic core storage unit 114 in which the digit now stored in the memory data register 134 is to be stored is presented to the memory address register 140. As shown in FIG. 14, this address can be, for instance, "01000." When this address is stored in the memory address register 140, the switching matrices 116, 118 and the line adapter 112 receive the binary coded address signals over the cable 142. However, the address has a value below "20000" and does not affect the line adapter 112. Incident to the presentation of the new address, the reset pulse applied to the terminal 1048 in the line adapter 112 resets the register 1010, but the digit previously stored therein is not lost because it is stored in the memory data register 134 which is not reset when the "P" address is presented. The address "01000" reads the digit stored in this location out of the memory 114, but the sense amplifiers 122, 124 are selectively blocked, and the addressed location is thus effectively cleared. During a subsequent portion of the memory cycle, an MDR to MBR signal is presented which transfers the digit stored in the memory data register 134 to the correct memory buffer register 126, 128, and this digit is then selectively written back from the memory buffer register 126, 128 into the selected storage location "01000." Thus, in the first two memory cycles in the execution cycle of the transfer field instruction, the digit at the first address "30019" in the line unit 110 has been transferred to a specific storage location "01000" in the memory 114. At the completion of this memory cycle, the "P" address "01000" is decremented by one and stored as "00999" in the proper register in the memory address register storage 148.

This operation continues in the manner described above to transmit the five remaining reply digits selected by the addresses "30018–30014" to the computer 102 for storage in the memory 114 at locations addressed as "00999–00995." More specifically, as each of the units digits of the "Q" address "8–4" are presented, the digits stored by the five groups of three gates 944–946, 941–943, 938–940, 935–937, and 932–934 are transmitted to and stored in the register 1010 in the line adapter 112 and then transferred through the memory data register 134 and the memory buffer registers 126, 128 to the storage locations in the memory 114 selected by the "P" addresses during the second of each pair of memory cycles. Since the digit of the reply addressed by the "Q" address "30014" is the last digit of the field to be transferred, the adapter 112 and the line unit 110 include means for providing a flag bit to advise the computer 102 that the transfer field operation has been completed when the bit received from the address "30014" has been transferred to the storage location at the "P" address "00995."

More specifically, when the "4" conductor in the cable 1164 receives a positive-going pulse from the output of the connected emitter follower 1166, this positive-going or ground signal is applied to the input of an inverter 1080 to place this inverter in a nonconductive condition. The more negative potential provided at the output of the inverter 1080 is applied to the input of an inverter 1078 to place this inverter in a conductive condition. In the addressed line unit 110, the more negative potential provided at the output of the inverter 922 connected to the "4" conductor in the cable 1164 is applied to one input of a "NAND" gate 970, the other input of which is connected to the common address enabling bus 997. Therefore, the output of the gate 970 also goes to ground. The outputs of the inverter 1078 and the gate 970 are connected to the input of the inverter 1036 and place this inverter 1036 in a nonconductive condition. The negative output potential from the inverter 1036 is applied to and enables the left-hand input of the gate 1026. Accordingly, when the remaining information in the last digit of the reply is stored in the register 1010, the flag bit flip-flop 1016 is set to supply a more positive or ground output at its set output terminal. This flag bit is detected when returned to the computer 102 and indicates that the transfer field operation is to be completed.

The receipt of the address "30014" by the line unit 110 also controls this circuit to indicate that the last reply digit has been transferred through the line adapter 112 to the computer 102 and to condition it to receive the digits of the designation of the next home unit to be called, such as the home unit 106. More specifically, when the output of the inverter 922 connected to the "4" conductor in the cable 1164 drops to a negative potential, a gate 924, the other input of which is connected to the common address enabling conductor 997, is fully enabled and supplies a more positive potential to the reset input of a flip-flop 866. If this flip-flop was not in a reset condition at this time, the flip-flop 866 is reset so that a negative enabling potential is applied to the upper input of a gate 864. The lower input of this gate is held at a more negative enabling potential by a flip-flop 868 which is reset. Thus, the gate 864 is fully enabled and provides a more positive or ground potential at its output which is applied to the center input of a gate 816.

This inhibits the gate 816. The potential at the output of the gate 864 is also applied to the input of an inverter 812 so that this inverter is placed in a nonconductive condition to supply a negative enabling input to the center input of a "NAND" gate 814 to partially enable this gate.

When the address "30014" is cleared from the memory address register 140, the enabling for the gate 924 is removed, and the output of this gate drops to a more negative potential. When the output of this gate was previously at ground potential, a "NAND" gate 874 was inhibited so that a more negative output was applied to one input of a "NOR" gate 858. This negative input causes the gate 858 to forward a more positive or ground potential through an emitter follower 856 to the reset inputs of thirteen shift register stages or flip-flops 841–854 forming the shift register 840. However, the gate 858 is normally controlled by a nonconductive inverter 860 to maintain the output of the emitter follower 856 at ground potential.

The input to the inverter 860 is normally held at ground potential at the output of the gate 874. However, when the gate 874 is inhibited, the input to the inverter 860 drops to a negative potential, and this inverter is placed in a conductive condition to apply ground potential to the left-hand input of the "NOR" gate 858. However, the emitter follower maintains ground potential on the reset leads of the stages of the shift register 840 because of the more negative potential provided from the output of the gate 874 to the right-hand input of the gate 858. The potential provided at the output of the gate 874 also charges a capacitor 861 through a diode 862 so that the capacitor 861 is charged to a negative potential.

When the address "30014" for the last digit of the reply is removed, the gate 924 becomes inhibited to supply a more negative potential to the connected input of the gate 874, and this gate now becomes enabled so that ground potential is now applied to both inputs of the "NOR" gate 858. The output of this gate now drops to a negative value which is forwarded through the emitter follower 856 to reset all of the stages of the shift register 840 and thus clear the reply previously stored therein. Further, when the output of the gate 874 rises to ground potential, the capacitor 861 starts to discharge. After a given time interval of a duration sufficient to effect the resetting of the shift register 840, the charge on the capacitor 861 is sufficiently depleted that the input to the inverter 860 drops toward ground potential. The inverter 860 is now placed in a nonconductive condition. When the inverter 860 is placed in a nonconductive condition, a negative potential is applied to the left-hand input of the "NOR" gate 858, and the output to the emitter follower 856 rises to ground potential to complete the resetting pulse. Thus, the shift register 840 has now been cleared to a condition in which it is capable of receiving and storing the digits of the designation of the next home unit to be called by the line unit 110.

When the shift register 840 is in its reset condition in which it is placed by the negative-going pulse provided by the emitter follower 856, the flip-flops 842-854 are all in a "0" representing condition in which ground is applied to the terminals "1R–13R," and a more negative potential is applied to the terminals "1S–13S." However, the reset lead for the "0" or input flip-flop 841 is connected to the set rather than the reset terminal so that the stage 841 stores a binary "1." In this condition, a more negative potential is applied to the terminal "OR" and ground potential is applied to the terminal "OS."

With the line unit 110 now in a condition to transmit an interrogation to any one of the home units on its connected signaling channel or line 108, the computer 102, in dependence on its stored program, can either process calls to other line units or can initiate a transfer field operation in which the designation of the next home unit to be called by the line unit 110 is transferred from the memory 114 through the line adapter 112 to the line unit 110 and stored therein. When the new station or home unit call station or home unit designation is stored in the line unit, the computer 102 is free to perform any other operation in its program, such as the recovery of data from other line units or the transmission of other calls over different line units. Assuming that the home unit 106, which is designated as "127," is now to be interrogated by the computer 102 through the line unit 110, a transfer field instruction is set up in the operation register 156 and in the memory address register storage unit 148 by storing the transfer field code "26" in the operation register 156, by storing the address in the memory address register 140 at which the unit digit "7" of the home unit 106 is stored in the "Q" address portion of the unit 148, and by storing the designation "30013" designating the part of the input means 900 in the line unit 110 which is to receive the units digit at the "P" address location in the storage unit 148.

As indicated above, following the completion of the instruction cycle in which these operation codes and addresses are set up, the "Q" address "15008" is stored in the memory address register 150 and forwarded over the cable 142 to the switching matrices 116, 118. During this memory cycle, the sense amplifiers 122, 124 and the memory buffer registers 126, 128 transfer the binary coded units called station digit "7" from the addressed storage location to the memory data register 134 in which it is stored. This digit is also written back into the storage unit at "15008" during this first memory cycle to maintain the digit for subsequent use on other calls to this station. Since this address has a value less than "20000," the line adapter 112 is not affected although the register 1010 therein is cleared by the signal supplied to the terminal 1048. The "Q" address "15008" is decremented and stored as "15007" in the register storage unit 148, and the related "P" address "30013" is then presented to the memory address register 140 and forwarded over the cable 142 to the line adapter 112. This address is translated and decoded in the manner described above by the components shown in FIG. 11 of the drawings so that when the positive-going signal is applied to the terminal 1103, the common address enabling conductor 997 drops to a negative potential to partially enable all of the gates in the input means 900 and the output means 930. Further, since the value of the units digit of the address is "3," the correspondingly designated conductor in the cable 1164 receives a positive-going pulse to place the connected inverter 922 in a nonconductive condition to enable an additional input in the gates 906–908 which are to receive the binary coded designation of the units digit of the next station to be called. Thus, two of the inputs to the gates 906–908 are now enabled.

As set forth above, the memory data register 134 is not reset when the "P" address is in the memory address register 140 during the second memory cycle involved in handling each digit during a transfer field operation. Thus, the plurality of terminals 1060 which are connected to the memory data register 134 contain a pattern of negative and ground signals representing the binary coded units digits "7" of the designation of the next station to be called. Since the value of this digit is "7," the terminals 1060 designated as "1,", "2," and "4" receive negative-going signals which partially enable three connected gates 1062 of six such gates connected either directly to the terminals 1060 or to these terminals through a pair of inverters 1064. The gate 1062 connected to the terminal 1060 designated as "8" is not enabled because this bit is not provided in the code, and the two gates 1062 coupled to the terminals "C" and "F" also are not partially enabled because the check bit and the flag bit are not present. It should be noted that the two terminals designated "C" and "F" receive positive-going rather than negative-going signals when the bit is present, thus requiring the presence of the inverters 1064 to provide enabling signals for the gates 1062.

The other input to the six gates 1062 is connected to the output of a normally conductive inverter 1072, the input of which is connected to the output of a "NAND" gate 1070. One input to the "NAND" gate 1070 is connected to the output of the inverter 1102 so as to be supplied with a ground inhibiting potential unless a positive-going signal is received by the terminal 1103 indicating that the address has a value in excess of "20000." The other input to the gate 1070 is connected to a terminal 1066 which receives a negative-going signal after the terminal 1103. The signal supplied to the terminal 1066 is used to transfer the value standing in the memory data register 134 to one of the memory buffer registers or, in the line adapter 112, to the register 1010.

More specifically, following the receipt of the positive-going signal on the terminal 1103, the terminal 1066 supplies a negative-going signal so that both inputs to the "NAND" gate 1070 are enabled. This applies a ground signal to the input of the inverter 1072 so that the right-hand input of all of the gates 1062 are enabled. Since the left-hand inputs of only the three left-hand gates 1062 corresponding to the binary bits "1," "2," and "4" are also enabled, The output of these three gates rises toward ground potential and sets three flip-flop stages 1011–1013 to store the binary bits "1," "2," and "4" of the units called station digit "7." The flip-flops 1014–1016 remain in their reset condition. When the flip-flops 1011–1013 are set, more negative potentials are applied to their reset terminals and, from these terminals, to the inputs of the three inverters 1082 which are connected through the emitter followers 1086 to the "1," "2," and "4" conductors in the cable 1090. These positive-going signals place the inverters 910, 912, and 914 in the line unit 110 in a nonconductive condition so that a third input to each of the three gates 906–908 is provided with a negative enabling potential. Thus, the data derived from the memory data register 134 in the computer 102 has now been transferred to the register 1010 in the line adapter 112 and has been forwarded over the data cable 1090 to further the enabling of the three gates 906–908 used to enter the units digit of the called station designation.

The data stored in the register 1010 is not disturbed during this second memory cycle in which the digit previously derived from the "Q" address "15008" is transferred to the address "30013" in the line unit 110 because one or the other of the two terminals 1056 and 1058 is returned to a ground potential which inhibits the "NAND" gate 1052. This means that the inverter 1051 remains in a conductive condition to apply an inhibiting potential to all six of the input gates 1021–1026 connected to the set input-output terminals of the stages 1011–1016 of the register 1010.

With the binary units digit "7" of the called station designation now stored in the register 1010 and presented to the gates in the input means 900, the computer 102 supplies a positive-going signal to a write terminal 1068. This signal places a pair of connected inverters 1074 and 1076 in a nonconductive condition. The output of the inverter 1076 provides an additional source of negative potential for the input of the inverter 1104 to hold this inverter in conduction past the time at which the ground pulse disappears from the terminal 1103.

The signal applied to the terminal 1068 also places the inverter 1074 in a nonconductive conditive condition so that a more negative signal is supplied to the input of an inverter 1084, the output of which is connected through an emitter follower 1088 to a write conductor extending over the cable 1099 to the input of an inverter 916 in the line unit 1010. Thus, the positive-going pulse at the output of the inverter 1084 places the inverter 916 in a nonconductive condition to apply an enabling input to all of the gates 901–909 and 918. Since the gates 906–908 have been selected by the units digit "3" of the address assigned to the line unit 110, the outputs of these gates connected to the terminals "6S," "7S," and "8S," respectively, are placed at ground potential in dependence on the binary coding forwarded over the "1," "2," and "4" conductors in the cable 1090. Since the units digit of the called stations designation is "7," all three of the gates 906, 907, and 908 are fully enabled, and the outputs thereof all rise toward ground potential. The terminals "6S," "7S," and "8S" are connected to the similarly designated terminals of the stages 847, 848, and 849, respectively, in the shift register 840. The application of ground to the terminal "6S," for instance, of the flip-flop 847 sets this flip-flop so that negative potential is applied to the terminal "6R." Similarly, the potentials applied to the terminals "7S" and "8S" set the flip-flops 848 and 849 so that ground potential is now applied to the terminals "6S," "7S," and "8S" and more negative potential is applied to the terminals "6R," "7R," and "8R." Thus, the binary bits "1," "2," and "4" of the units digit of the called station designation are now stored in the flip-flops 847–849.

At the end of the current memory cycle, the more positive or ground signal is removed from the terminal 1068 and the address "30013" is removed from the memory address register 140, decremented by one, and returned to the memory address register storage unit 148. When the terminal 1068 returns to a more negative potential, the inverters 1074 and 1076 are placed in conduction and the inverter 916 removes the enabling potential from the gates 906–908. When the inverter 1076 is placed in conduction, the input to the inverter 1104 is placed at ground potential, and the "over 20000" latch including the two inverters 1104 and 1106 is reset to apply a negative potential to the inputs of the inverters 1102 and 1108.

The computer 102 then initiates an additional memory cycle in which the address "15007" is placed in the register 140 to transfer the binary coded value of the tens digit of the called station designation to the memory data register 134. Incident to these operations, the register 1010 in the line adapter 112 is reset or cleared by the pulse applied to the terminal 1048. The address "15007" is decremented and stored as "15006" in the memory address register storage unit 148, and the corresponding "P" address "30012" is placed in the register 140. This address is decoded and translated by the circuitry shown in FIG. 11 in the manner described above and presented to the line units. Since the address is individual to the line unit 110, the common address enabling conductor 997 is again placed at a negative potential, and the inverter 922 connected to the "2" conductor in the cable 1164 is placed in a nonconductive condition to partially enable the three gates 903–905 which are used to store the binary coded value of the tens digit of the called station designation in the shift register 840. The value of this digit previously stored in the memory data register 134 from the storage location "15007" is transferred through the gates 1062 and stored in the register 1010 in the manner described above in response to the application of the negative-going signal to the terminal 1066. Subsequently in this memory cycle, the application of a positive-going pulse to the terminal 1068 transfers the value stored in the register 1010 through the inverters 910, 912, and 914 to selectively enable the gates 903–905 in accordance with the value of the tens digit.

Since the value of the tens digit is "2," only the gate 904 is fully enabled. The output of this gate is connected to the terminal "4S" of the shift register stage or flip-flop 845. Accordingly, this stage is set so that ground potential is applied to the terminal "4S" and negative potential is applied to the terminal "4R." The gates 903 and 905 connected to the indicated terminals of the flip-flops 844 and 846 are not enabled, and the stages 844 and 846 remain in a reset condition in which ground potential is applied to the terminals "3R" and "5R" and negative potential is applied to the terminals "3S" and "5S." Incident to this operation, the "P" address "30012" is cleared from the register 140, decremented, and stored in the memory address register storage unit 148 as "30011."

The computer 102 now controls the transfer of the hundreds digit of the called station designation from the "Q" address "15006" (see FIG. 14) to the line unit 110 by the use of the "P" address "30011." This "P" address partially enables the gates 901, 902, and 909, and the enabling of these gates is completed during the second memory cycle by the inverters 910, 912, and 914 in accordance with the value of the hundreds digit. Since a field call is not involved, the gate 909 remains inhibited. Further, since the value of the hundreds digit is "1," the gate 901 remains inhibited, and only the gate 902 is enabled. The ground signal provided at the output of the gate 902 is supplied to the terminal "2S" of the flip-flop 843 and sets this flip-flop so that ground is applied to the terminal "2S" and a more negative potential is applied to the terminal "2R." Thus, the shift register 840 is now in a condition in which the stages 850–854 are reset to a "0" condition and in which the address is stored in the stages 842–849, as "01010111," the initial stage 841 being in a "1" condition as a result of the prior resetting of the shift register 840.

Since the hundreds digit is the last digit in the field to be transferred incident to this operation, this digit includes a flag bit which is detected by the computer 102 to indicate the termination of the transfer field operation. The computer 102 now continues with its stored program to perform other reply receiving or designation transmitting operations. With the designation "127" of the next home unit 106 to be called stored in the shift register 840, the line unit 110 is placed in operation to transmit the designation over the signaling channel 108 to all of the connected home units to cause the response of only the single home unit having the individual designation "127." This initiation of the designation transmitting operation is initiated incident to supplying the address "30011" to the line unit 110.

More specifically, a gate 918 is fully enabled under the control of the write inverter 916, the decoding inverters 992 and 996, and the inverter 922 connected to the "1" conductor in the cable 1164 when the address "30011" is supplied to the line unit 110 and the write signal is received. The positive-going pulse provided at the output of the gate 918 advises the line unit 110 that the complete station designation has been transmitted and that the reply transmitting operation can be initiated. Since data transmission between the line unit 110 and the home units 104 and 106 on the connected signaling channel 108 utilizes a variable pulse width transmitting technique, one of the first operations performed at the initiation of the transmission of a new station designation is the resetting of a timing circuit 720 in the line unit 110 which times the transmission and reception of signals.

The timing circuit 720 includes seven counting flip-flop circuits 721–727 which are connected in the manner described above to provide a binary counter. The input to the input stage 721 is connected to a clock pulse source 728 or any other suitable and well known source of timing signals, such as an additional counter driven by a crystal controlled oscillator. The time intervals in milliseconds at which the successive stages of the counter are operated is indicated by the characters in the logic blocks for the stages 721–727 shown in FIG. 7 of the drawings. The timing counter 720 is continuously operated from the time pulse source 728 and can be in any setting at the time that the complete station designation is stored in the shift register 840.

The positive-going pulse provided at the output of the gate 918 supplies an inhibiting potential to one input of a "NAND" gate 718 whose output is connected through an emitter follower 719 to the reset inputs of the flip-flops 721–727. When the gate 718 is inhibited, a negative-going pulse is applied to all of the reset inputs of the flip-flops 721–727 to reset this counter to a normal condition. Thus, the counter 720 is reset in response to completion of the storage of the station designation in the shift register 840.

The positive-going pulse provided at the output of the gate 918 is also applied to the input of an inverter 926 to generate a negative-going pulse at its output. The trailing edge of this pulse resets a flip-flop 880 used for storing a call check error so that ground is applied to the terminal "C" and thus to one input of the gate 947. The negative-going pulse provided at the output of the inverter 926 is also forwarded to one input of a "NOR" gate 826 which, together with a "NOR" gate 828, provides a reply flip-flop. The negative pulse applied to one input of the gate 826 drives its output to a positive potential which is applied to one input of the gate 828. Since the other input to the gate 828 is also at ground potential, the output of the gate 828 drops to a negative potential which is applied to the other input of the gate 826 to hold this gate in an inhibited condition providing a ground output when the pulse provided by the gate 918 disappears.

The more positive or ground output at the output of the gate 826 is applied to one terminal of the gate 874 and provides an inhibit for this gate so that a more negative output is provided by this gate. This negative output holds the emitter follower 856 in a conductive condition so that ground is maintained on the reset leads to the stages of the shift register 840. The gate 874 and the inverter 860 are not effective to reset the register 840 until the gate 874 returns to a fully enabled condition. The ground signal supplied by the gate 826 is also applied to one input of the gate 876 and provides an inhibit for this gate so that the output of this gate drops to a negative potential. This potential is applied to one input of the gate 878 and also the center input of the busy gate 931. This negative potential partially enables the gate 931 so that this gate will become fully enabled if the address of the line unit 110 used for detecting the busy or idle condition, i.e., "30010," is transmitted by the line adapter 112. The negative output from the gate 876 is also applied to one input of a gate 796 to partially enable this gate and to the input of an inverter 736. This places the inverter 736 in conduction so that an inverter 734 is placed in a nonconductive condition. When the inverter 734 is placed in a nonconductive condition, this inverter attempts to supply negative potential to a number of components in the system. However, the output of the inverter 734 is connected directly to ground through a pair of normally closed contacts 732a on a receiving relay 732 connected through a fullwave bridge 738 to the signaling channel 108.

The more positive or ground potential provided at the output of the gate 826 is applied to one input of a "NAND" gate 806 to inhibit this gate. This positive-going transition is also applied to the set terminal of a flip-flop 800 to set this flip-flop so that a more negative potential is applied to the reset output terminal of this flip-flop. The negative potential provided at the reset output of the flip-flop 800 initiates the charging of input capacitors in a pair of connected flip-flops 802 and 886.

The more positive or ground output from the gate 826 also places an inverter 752 in a nonconductive condition so that a ground clamp is removed from the reset output terminal of a line flip-flop 750. This reset output terminal of the flip-flop 750 is connected through an emitter follower 748 to the input of an inverter 746 which is normally maintained in a nonconductive condition to permit a line transmitting relay 744 to remain in a released condition in which a pair of contacts 744a are maintained closed to place the signaling channel 108 in a conductive or mark state.

The more negative potential at the output of the gate 828 partially enables a call check gate 810 and also completes the enabling of a gate 808 so that the output of this gate rises from a negative potential toward ground potential. This transition is effective through a capacitor 821 to set a monostable circuit 820 having a five millisecond delay period. When the monostable circuit 820 is set, a ground inhibiting potential is applied to one input of the call check gate 810 and a negative potential is applied to the reset input terminal of the flip-flop 800 to initiate the charging of its input capacitor.

The positive-going pulse at the output of the gate 808 is also applied to the set and reset terminals of the line flip-flop 750 and is effective to place this flip-flop in a set condition in which a negative potential is supplied from its reset output terminal through the emitter follower 748 to the input of the inverter 746. This places the inverter 746 in a conductive condition and produces a flow of current through the winding of the transmitting relay 744 so that this relay operates to open the contacts 744a. When the contacts 744a are opened, the continuity of the signaling channel 108 is interrupted, and a long space signal used to prepare the home units 104 and 106 for the reception of station designation signals is started. The effect of the long space signal on the home units 104 and 106 is set forth in detail in the above-identified copending Currey et al. and Haselwood et al. applications.

When the continuity of the signaling channel 108 is interrupted by the operation of the transmit relay 744, the operating circuit for the receive relay 732 including a potential source 740 connected in series with the channel 108 is interrupted, and this relay releases to open the normally closed contacts 732a. This permits the negative potential at the output of the inverter 734 to initiate the charging of a pulse generating capacitor 735 and to place the inverter 730 in a conductive condition. A pulse generating capacitor 731 connected to the output of the inverter 730 is now in a charged condition so that when the inverter 730 is placed in a conductive condition, a positive-going pulse is supplied to the input of a monostable circuit 702 having a delay time of .1 millisecond.

When the monostable circuit 702 is set, a negative potential is applied to the input of an inverter 706 to place this inverter in conduction so that ground is applied to the center input of a "NOR" gate 708, the right-hand input of this gate being held at ground potential by an inverter 712 that was placed in a conductive condition when a "NAND" gate 714 was inhibited by the ground output signal from the gate 826 in the reply flip-flop. The gate 714 is also inhibited by the ground signal from the terminal "13R" of the shift register 840 when the shift register is reset. The negative potential provided at the input to the inverter 706 also charges a capacitor 704. The negative potential provided at the output of the monostable circuit 702 is also applied to one input of the "NOR" gate 708 so that this gate maintains ground potential on the input of an emitter follower 710.

These components remain in this condition until the delay period of the monostable circuit 702 has expired. At this time, the monostable circuit 702 returns ground potential to the left-hand input of the gate 708. The inverter 706 remains in a conductive condition because of the charged capacitor 704 for around thirty microseconds. Thus, all of the inputs to the gate 708 are now maintained at ground potential, and the gate 708 provides a thirty microsecond negative-going pulse which is coupled through the emitter follower 710 to the input of an inverter 716. This pulse places the inverter 716 in a conductive condition to apply a thirty microsecond positive-going pulse to the input of the gate 718. This pulse is effective through the emitter follower 719 to reset the timing circuit or counter 720 in the manner described above so that this circuit starts a timing interval in direct response to the transition of the signaling channel 108 from a normal mark condition to a space condition. The positive-going pulse at the output of the inverter 716 is also applied to the shift pulse input for all of the stages 841–854 in the shift register 840 so that the address previously stored in the stages 842–849 of this counter is now stored in the stages 843–850 of this counter. The shift pulse input to the stage 841 is such that it is set to a "0" or reset state by each shift pulse. Accordingly, in response to the transition of the signaling line 108 from a mark condition to a space condition, the timing counter 720 is reset, and the shift register 840 is operated a single step.

The pulse provided by the monostable circuit 702 which reset the timing counter 720 and shift the shift register 840 are also used in conjunction with the monostable circuit 820 to determined whether the signaling line 108 actually receives the signals sought to be applied to it by the transmit relay 744 during the transmission of information from the line unit 110 to the home units 104 and 106. More specifically, the center input to the call check gate 810 is enabled when the reply flip-flop including the two gates 826 and 828 is set. The right-hand input to the gate 810 is inhibited when the monostable circuit 820 sets but is returned to an enabled condition at the end of the five millisecond delay of the circuit 820. The left-hand input of the gate 810 is connected directly to the output of the monostable circuit 702 and is normally inhibited by the ground potential provided by the circuit 702.

Since the monostable circuit 820 is set by the same signal used to complement the line driving flip-flop 750, the gate 810 is inhibited on its right-hand input by the monostable circuit 820 for a period of five milliseconds following the attempt to operate the line relay 744. If the monostable circuit 702 which responds to changes in the conditions of the signaling line 108 is set, thus indicating the receipt of a line transition, more than five milliseconds following the setting of the monostable circuit 820, all three inputs to the call check gate are enabled, and a positive-going or ground signal is applied to the set input-output terminal of the flip-flop 880. This sets the flip-flop 880 so that a negative enabling signal is applied to the terminal "C," and from this terminal to the like-designated input terminal of the gate 947. Thus, a bit will appear on the "1" conductor in the cable 980 when the address "30019" is presented to indicate the presence of a call check error. Alternatively, if the line transition in the signaling channel 108 occurs within the five millisecond delay period of the monostable circuit 820, the call check gate 810 is inhibited when the state of the monostable circuit 702 is changed, and a call check error indication is not provided. This operation occurs not only on transitions from space-to-mark but also from mark-to-space.

Referring now to the previously described operation of the monostable circuit 702 to reset the counter 720 and to shift the shift register 840, these operations occur within the five millisecond delay period of the circuit 820 if the system is in proper operating condition. Thus, when the monostable circuit 820 times out, the gate 810 is inhibited by the monostable circuit 702. However, when the circuit 820 resets, the charged input capacitor connected to the reset input of the flip-flop 800 delivers a positive-going pulse to reset the flip-flop 800 so that a positive-going pulse is coupled to the reset terminal of the open line flip-flop 886 to apply an inhibiting potential to the terminal "0" connected to the gate 748. The positive-going pulse provided at the output of the flip-flop 800 is also applied to the set input of the flip-flop 802 and sets this flip-flop so that the gate 808 is inhibited. Thus, the output potential from the gate 808 drops to a negative potential to initiate the charging of the capacitor 821 and the two input capacitors for the line driving flip-flop 750.

The line unit 110 remains in this condition with the settings of the counter 720 being advanced to indicate time elapsed since placing the signaling channel 108 in a space condition. At the end of an elapsed time of one hundred and sixty-six milliseconds, the flip-flops 723 and 725 in the timing counter 720 are both in a set condition so that negative potentials are applied to both inputs of a "NAND" gate 804. The output of the gate 804 rises toward ground potential and delivers a positive-going pulse to the reset input-output terminal of the flip-flop 802. This resets the flip-flop 802 so that its set terminal applies a negative potential to the gate 808. The output of the gate 808 now rises to a more positive potential and is effective through the capacitor 821 to again set the monostable circuit 820. The positive-going pulse developed at the output of the gate 808 is also applied to both inputs of the line driving flip-flop 750 so that this flip-flop is placed in a reset condition in which its reset terminal forwards ground potential through the emitter follower 748 to the input of the line driving inverter 746. This terminates conduction through the inverter 746 so that the transmit relay 744 is released to close the contacts 744a. This reestablishes the continuity of the signaling channel 108 and initiates the transmission of a mark signal of a duration representing the value of the first binary bit of the address to be transmitted over the channel 108 to all of the home units connected in series thereon.

More specifically, when the relay 744 is released to close the contacts 744a, the continuity of the signaling channel 108 is reestablished, and the receiving relay 732 is operated to close the contacts 732a. This applies ground to the input of the inverter 730 to place this inverter in a nonconductive condition and to permit the pulse generating capacitor 731 to be charged. The closed contacts 732a also ground one side of the capacitor 735 so that this capacitor delivers a positive-going pulse to set the monostable circuit 702. The setting of the monostable circuit 702 resets the timer 720 in the manner described above and also provides a second shift pulse to the shift register 840 so that the eight bits of the called station designation are shifted and are now stored in the stages 844–851, the "1" bit of the units digit of the designation being stored in the flip-flop 851. The line unit 110 now transmits a series of signals including signals, either mark or space, of seventy-five milliseconds duration representing a binary "1" and signals, either mark or space, of thirty-three milliseconds duration representing a binary "0." The mark or space condition of the line is determined by the state in which the signaling channel is placed at the beginning of the bit to be transmitted.

In the assumed example, in which the value of the units digit of the called station designation is "7," the units "1" bit is present and is now stored in the flip-flop 851 which is in a set or "1" condition in which a negative potential is applied to a terminal "10R." Thus, the upper input to a gate 814 is enabled, the center input terminal being enabled by the output of the inverter 812. The lower input to the gate 814 is connected to and enabled by the output of a "NAND" gate 824 whose two inputs are connected to the reset terminals of the flip-flops 721 and 724 of the timing counter 720. When the gate 814 is fully enabled by shifting a "1" into the flip-flop 851, its output rises toward ground and inhibits the gate 808. The output of the gate drops to a negative potential to initiate the charging of the pulse generating capacitor.

When the flip-flops 721 and 724 in the counter 720 are set after an elapsed time of approximately seventy-five milliseconds, the gate 824 is fully enabled, and an inhibiting signal is applied to the lower input of the gate 814. When the gate 814 is inhibited, its output drops to a negative potential and completes the enabling of the gate 808. When the gate 808 is completely enabled, the monostable circuit 820 is again set, and the line flip-flop 750 is complemented so that the inverter 756 is placed in a conductive condition to operate the relay 744 to open the contacts 744a. This interrupts the continuity of the line 108 to place it in a spacing condition and to start the transmission of the following bit of the called station designation. This transition causes the release of the relay 732 and the development of a positive-going signal by the capacitor 731 which again sets the monostable circuit 702. The monostable circuit 702 again resets the timing counter 720 and shifts the shift register 840 so that the second bit or binary "2" value of the units digit designation is shifted into the flip-flop 851.

When the timing counter 720 is reset, the gate 824 is inhibited so that the lower input to the gate 814 is provided with a negative enabling potential. Since the second bit representing the value of the "2" bit of the first digit of the address is also a binary "1," the register stage 851 is set, and the upper input to the gate 814 is provided with an enabling potential by the flip-flop 851. This enables the gate 814 and inhibits the gate 808 so that its output drops to a more negative potential to initiate the charging of the capacitor 821 and the pulse forming capacitors at the input of the line flip-flop 750.

Since the binary "1" is stored in the flip-flop 851 representing the second bit to be transmitted over the signaling channel 108, the system 100 remains in this condition until the gate 824 is again enabled by the timing counter 720 at the end of approximately seventy-five milliseconds. At this time, the gate 824 is fully enabled to provide an inhibiting input to the lower input terminal of the gate 814. The output of the gate 814 now drops to a more negative potential to enable the gate 808 so that its output rises to a more positive potential. This again sets the monostable circuit 820 and complements the line flip-flop 850 so that it forwards a more positive potential through the emitter follower 748 to the input of the inverter 746 to place this inverter in a nonconductive condition. This releases the transmitting relay 744 to close the contacts 744a. This reestablishes the continuity of the signaling channel 108 and terminates the seventy-five millisecond space condition representing the binary "1" which was transmitted as the second bit in the call.

When the relay 744 closes to release the contacts 744a, the receive relay 732 is operated to close the contacts 732a. This controls the monostable circuit 702 to again reset the timing circuit 720 and to shift the shift register 840 so that the third bit of the call is now stored in the flip-flop 851. Since the third bit representing the binary value "4" in the units digit of the called station designation is also a "1," the flip-flop 851 is set. The line unit 110 now transmits a seventy-five millisecond mark condition over the channel 108 representing the fact that the third transmitted bit in the station designation is a "1." At the end of the seventy-five millisecond interval determined by the counter 720, the line is changed to a space condition by the operation of the transmit relay 744 to open the contacts 744a. The corresponding release of the relay 732 controls the monostable circuit 702 to reset the timing counter 720 to its normal poistion and to shift the fourth bit of the call into the flip-flop 851.

Since the fourth bit of the call is a "0" representing the absence of the binary value "1" in the binary coded value of the tens digit "2" of the called station designation, the flip-flop 851 is not set, and a ground inhibiting potential is immediately applied to the upper input of the gate 814 when the gate 824 is disabled by resetting the counting circuit 720. This means that the output of the gate 814 remains negative to maintain the full enabling of the gate 808 so that its output remains at ground potential.

With the output of the gate 814 held at a negative potential by the inhibiting potential resulting from the reset condition of the flip-flop 851 storing the bit to be transmitted, the time at which the gate 808 is fully enabled to provide the positive-going pulse for complementing the flip-flop 750 and thus changing the state of the signaling channel 108 to select the duration of the transmitted bit is transferred to the second stage 722 of the timing counter 720. When this stage is set following an elapsed time of around sixteen milliseconds, an inhibiting potential is applied to the upper input of the gate 808, and the output of this gate drops to a more negative potential to initiate the charging of the pulse generating capacitors in the flip-flop 750 and also the capacitor 821.

At the end of the thirty-three milliseconds, the stage 723 is set and the stage 722 is reset, and an enabling potential is returned to the upper input to the gate 808. The output of this gate now rises to a more positive potential. This sets the monostable circuit 820 and complements the line flip-flop 750 so that the inverter 746 is placed in a nonconductive condition to release the relay 744. Thus, the signaling line 108 is transferred from a space condition to a mark condition following an elapsed time of around thirty-three milliseconds to transmit a "0" as the first bit in the binary coded tens digit of the called station designation. This line transition operates the monostable circuit 702 so that the timing circuit 720 is reset and the shift register 840 is shifted a single position to place the fifth bit to be transmitted in the stage 851.

The line unit 110 now transmits the fifth, sixth, seventh, and eighth digits "0101" forming the remainder of the code for the tens digit and the complete code for the value of the hundreds digit in the manner described above. As indicated, this technique is one in which the gate 808 becomes fully enabled to provide a positive-going pulse for complementing the line flip-flop 750 at the end of thirty-three milliseconds under the control of the flip-flop 722 in the timing counter for binary "0's" and at the end of seventy-five milliseconds under the control of the gates 824 and 814 to represent binary "1's." The data receiving means in the home units 104 and 106 responds to the thirty-three and seventy-five millisecond durations of the binary "0" and "1" representing pulses independent of whether these durations represent mark or space conditions in the signaling channel 108.

When the signaling channel 108 is returned to a mark or conductive condition by the release of the relay 744 at the time the transmission of the eighth bit in the address is terminated, the counter 720 is reset, and the shift register 840 is advanced a single step under the control of the monostable circuit 702 in the manner described above. This moves the last address bit into shift register stage 852 and moves the preliminary "1" bit initially stored in the stage 841 into the flip-flop 851. Thus, the flip-flops 841–850 are all in a "0" state, and the flip-flop 851 is set. This condition indicating the termination of the transmission of the interrogation or called station designation to the signaling channel 108 is detected by a pair of "NAND" gates 762 and 764 and a "NOR" gate 766.

More specifically, when this condition is established, all of the inputs to the gates 762 and 764 are at a negative enabling potential, and the outputs of these two gates rise toward ground to provide a more positive input for two inputs of the "NOR" gate 766. The third or right-hand input to the gate 766 is connected to the terminal "9R" which receives a ground potential from the reset flip-flop 850. With all of the inputs to the "NOR" gate 766 at ground potential, the output of the gate 766 drops to a more negative potential to provide an enabling potential at the center input of a gate 830. The left-hand input of the gate is provided with a negative enabling potential from the flip-flop 841 which is in a reset condition. The right-hand input to the gate 830 receives a negative enabling potential from a "NAND" gate 832. Thus, the output of the gate 830 rises toward ground and resets the reply flip-flop including the two "NOR" gates 826 and 828.

More specifically, when the output of the gate 830 rises to ground, both inputs of the gate 826 are placed at ground, and the output of this gate drops to a negative potential which is returned to one input of the gate 838. This clamps the output of the gate 828 at ground potential. When the output of the gate 826 drops to a negative potential, the inverter 752 is placed in a conductive condition to apply a ground clamp to the input of the emitter follower 748. This holds the inverter 746 in a nonconductive condition to hold the relay 744, which is now released, in a released condition to maintain the continuity of the signaling channel 108 at the end terminated in the line unit 110. The negative output from the gate 826 also partially enables a gate 806 and initiates the charging of a capacitor in the set input circuit for the flip-flop 800. The more positive output potential from the gate 828 inhibits the call check gate 810 to prevent the setting of the flip-flop 880. The more positive output from the gate 828 also applies a positive-going pulse to the reset input terminal in the flip-flop 868 to insure that this flip-flop is in a reset condition with a negative potential supplied from its set output terminal to the lower input of the gate 864.

When the output from the gate 826 drops to a more negative potential, the left-hand input of the gate 876 in the busy latch is provided with an enabling potential. However, the center input remains at a more positive potential so that the output of the gate 876 remains negative to mark the line unit 110 as busy. However, when the output of the gate 826 drops to a more negative potential, the gate 874 becomes fully enabled, and its output rises to a more positive potential toward ground. This controls the "NOR" gate 858, the inverter 860, and the capacitor 861 to produce a negative-going pulse of around thirty microseconds duration which is coupled through the emitter follower 856 to reset the shift register 840 to a condition in which a "1" is stored in the stage 841 and binary "0's" are stored in the stages 842–854. The trailing edge of the negative-going pulse from the emitter follower 856 is also applied to the reset terminals of the flip-flops 882 and 884 to reset these flip-flops to a condition in which ground potential is applied to the terminals "NR" and "P." The negative-going pulse at the output of the emitter follower 856 is also applied to one input terminal of a "NOR" gate 756 which, together with a cross-connected "NOR" gate 754, provides a bistable circuit or flip-flop. The negative-going pulse applied to the right-hand input of the gate 756 from the emitter follower 856 drives the output of the gate 756 to a more positive potential which is returned to the right-hand input of the gate 754. Since the other input to the gate 754 is also held at ground potential, the output of this gate drops to a negative potential to hold the output of the gate 756 at approximately ground potential. This is the reset state of the flip-flop including the pair of "NOR" gates 754 and 756.

The line unit 110 now awaits a response from the home unit 106 whose designation "127" has just been transmitted. The response from the home unit is provided with the same type of signals used to transmit the interrogation or station designation. A binary "0" in the reply is represented by a line transition from either mark-to-space or space-to-mark occurring more than sixteen milliseconds and less than fifty milliseconds from the preceding transition. A binary "1" is represented by a line transition of either type occurring more than fifty milliseconds and less than one hundred milliseconds from the preceding line transition. The gate 806 connected to the terminal "OS" of the input flip-flop 841 is controlled by the timing circuit 720 to distinguish between received "0's" and "1's."

When the first line transition from a mark to a space condition is received, the relay 732 is released, and the monostable circuit 702 again resets the timing counter 720 and shifts the register 840 a single step so that the preliminary "1" stored in the stage 841 is shifted into the stage 842. The negative-going pulse provided at the output of the emitter follower 710 incident to this operation sets the flip-flop including the gates 754 and 756 so that the output of the gate 754 is now held at ground potential and the output of the gate 756 is held at a more negative potential. The negative-going pulse from the emitter follower 710 also resets a flip-flop or bistable circuit including a pair of cross-connected "NOR" gates 758 and 760. More specifically, the negative-going pulse from the emitter follower 710 places the output of the gate 760 at ground potential, and this ground potential is returned to one input of the gate 758. The other terminal of the gate 758 is held at ground potential at the reset terminal of the flip-flop 725. Thus, the output of the gate 758 is a negative potential which is applied to one input of the gate 760 to maintain the output of the gate 760 at ground.

Referring now more specifically to the gate 806 used to distinguish binary "1's" and binary "0's" in the reply, the right-hand input of this gate is held at a negative potential by the output of the gate 826. The left-hand input of the gate 806 is connected to the reset output terminal of the flip-flop 722, and the center input terminal of the gate 806 is connected to the reset output of the flip-flop 723. Accordingly, if both of the flip-flops 722 and 723 are operated to a set condition indicating an elapsed time of fifty milliseconds since the initial line transaction in the reply, the gate 806 becomes fully enabled, and the "OS" terminal of the input flip-flop 841 is pulled toward ground potential to set the flip-flop 841. Alternatively, if the second line transition in the reply which terminates the transmission of the first bit of the reply occurs before fifty milliseconds have elapsed, the gate 806 is not fully enabled, and the shift pulse provided by the inverter 716 shifts the preliminary "1" from the stage 842 to the stage 843 and shifts a binary "0" from the stage 841 to the stage 842. In this manner, the time between successive shift pulses and the necessary elapsed time for fully enabling the gate 806 stores a pattern of binary "1's" and "0's" in the stages of the shift register 840 which are shifted through the register with a "1" in advance of the received message from the selected home unit 106.

The reception of the eleven bits of the reply from the selected home unit 106 takes place in the manner described above so that a pattern of "0's" and "1's" is stored by the reset and set conditions, respectively, of the flip-flops 841–852. The preliminary "1" is stored in the flip-flop 853, and the flip-flop 854 is in a reset condition. The line transition terminating the last or eleventh bit of the reply returns the signaling channel 108 to a mark condition so that a negative potential is supplied from the output of the inverter 730 to the lower input of a "NAND" gate 776. The upper input of this gate is connected to the output of the gate 756 which is now at a negative potential because at least one line transition has occurred during the reply. Thus, the upper and lower inputs to the gate 776 are provided with enabling potentials.

The center input to this gate is connected to the output of the "NOR" gate 760. The output of this gate is driven to ground potential each time that the timing counter 720 is reset. However, one input to the gate 758 is connected to the reset output terminal of the flip-flop 725. Accordingly, when the flip-flop 725 is set following an elapsed time of one hundred and thirty-three milliseconds following the transition placing the channel 108 in its normal marking condition, the center input to the gate 776 is enabled, and this gate is now fully enabled to supply a more positive or ground signal to the connected input of an end-of-reply gate 796. The application of an inhibiting potential to one of the inputs of the gates 796 drops the output of this gate to a more negative potential which is applied to the center input of the gate 876 in the busy flip-flop. Since all of the inputs to the gate 876 are now supplied with an enabling potential, the output of the gate 876 rises to ground potential and applies an inhibit to the busy gate 931 to mark the line unit 110 as being idle. The ground output from the gate 876 is also returned to the right-hand input of the gate 796 to hold the output of this gate at the more negative potential. This terminates the reception of the reply by the home unit 110.

The ground potential at the output of the gate 876 is also applied to the input of the inverter 736 so that this inverter is placed in a conductive condition. After a brief time delay, the inverter 734 is placed in a conductive condition to clamp one side of the capacitor 735 to ground potential and to hold the inverter 730 in a nonconductive condition independent of the state of the contact 732a. This renders the line unit 110 insensitive to spurious interruptions in the signaling channel 108.

The line unit 110 now has the reply from the previously interrogated home unit 106 stored in the flip-flops 841–852 in the shift register 840. The set or reset condition of these individual flip-flops controls the application of enabling or inhibiting potentials to the designated terminals of the gates 932–943 in the output means 930. Accordingly, when the line unit 110 is next addressed as "30010," the gate 931 will indicate that the line unit 110 is in an idle condition, and the subsequent presentation of the addresses "30019–30014" will permit the information stored in the output means 930 to be transferred to the memory 114 in the computing means 102.

As indicated above, the line unit 110 includes means for detecting signal transmission errors and other abnormalities that might occur during transmission of data between the home units 104, 106 and the line unit 110. A first one of the errors checked by the system is to determine whether a line transition during the reply occurs only in an interval of from sixteen to ninety-nine milliseconds following a prior line transition. The flip-flop 884 is set if line transitions occur before sixteen milliseconds have elapsed following the preceding line transition or occur more than ninety-nine milliseconds following the preceding line transition. The setting of the flip-flop 884 is controlled by a "NOR" gate 791 whose output terminal is connected to the set terminal of the flip-flop 884. The gate 791, in turn, is controlled by five "NOR" gates 786, 787, 788, 789, and 790 and a single "NAND" gate 792. The inputs to the "NOR" gate 786 are connected to the reset outputs of the flip-flops 722, 723, and 724 so that the gate 786 provides a negative output from zero to sixteen milliseconds and at times over one hundred and thirty-three milliseconds. The two inputs to the gate 787 are connected to the set outputs of the flip-flops 723 and 724 so that the gate 787 provides a negative output between ninety-nine and one hundred and thirty-three milliseconds. The outputs of the two gates 786 and 787 are applied to the inputs of the "NOR" gate 788 so that this gate provides a more negative output between sixteen and ninety-nine milliseconds. The output of the gate 788 is connected to one input of the gate 789.

Another input to the gate 789 is derived from the output of the gate 754 which rises to ground potential as soon as the first line transition in the reply is received. The right-hand input to the gate 789 is connected to the output of the gate 760 which drops to a negative potential one hundred and thirty-three milliseconds after a preceding line transition. Thus, the output of the gate 789 drops to a negative potential after a first line transition has been received and in the intervals between zero and sixteen milliseconds and ninety-nine and one hundred and thirty-three milliseconds. The output from the gate 789 provides one input for the gate 790.

The other input to the gate 790 is also connected to the output of the gate 760 and receives a more negative potential after one hundred and thirty-three milliseconds have elapsed following a preceding line transition. Thus, the output of the gate 790 becomes negative in the interval between sixteen and ninety-nine milliseconds following the preceding line transition. The output of the gate 790 is connected to one input of the gate 791. The left-hand input to the gate 791 is connected to the output of the gate 754 to receive a ground in response to the receipt of the first line transition in the reply by the line unit 110. The center input to the gate 791 is connected to the output of the gate 792. One input to the gate 792 is connected to the output of the gate 826 and drops to a negative potential as soon as the call has been transmitted and the reply is expected. The other input to the gate 792 is connected to the output of the monostable circuit 702 and thus is normally held at ground potential but drops to a more negative potential for .1 millisecond in response to each line transition detected by this circuit. Thus, the output of the gate 792 provides a series of positive-going pulses, each representing a line transition received by the line unit 110 during the reply.

With these inputs, the output of the gate 791 is held at ground potential after a first line transition has been received in the interval between sixteen and ninety-nine milliseconds following each line transition of the reply. If the output of the gate 792 rises to ground potential at any time other than between sixteen and ninety-nine milliseconds following a preceding line transition, all of the inputs to the "NOR" gate 791 are at ground, and the output of the gate 791 drops to a negative potential to charge the input capacitor connected to the set terminal of the flip-flop 884. At the termination of the line transition, the output of the gate 791 rises to ground potential, and a positive-going pulse is supplied to the set terminal of the flip-flop 884. When the flip-flop 884 is set, a more negative potential is applied to the terminal "P" to partially enable the gate 949. This will cause a bit to be supplied to the "4" conductor in the cable 980 when the address "30019" is presented to register the fact that a pulse error occurred during the reception of the reply whose data is stored in the remaining gates of the output means 930.

Another condition checked by the line unit 110 is the persistence of an unusually long space condition on the signaling channel 108 during the interval in which an attempt is being made to place a call to a home unit and receive a reply therefrom. This error condition is stored by the flip-flop 886 whose set output is connected to the output of a "NAND" gate 782. The reset terminal of the flip-flop 886 is connected to the reset output terminal of the flip-flop 800 so that the flip-flop 886 is reset at the end of the long space pulse used to initiate the transmission of a call to a home unit.

The gate 782 controlling the setting of the flip-flop 886 includes one input connected to the contacts 732a. This input receives a negative potential when the signaling channel is in a space condition. The other input to the gate 782 is connected to the output of a "NOR" gate 784. One of the inputs to the "NOR" gate 784 is connected to the output of the gate 758 and receives a ground potential after an elapsed time of one hundred and thirty-three milliseconds. The other two inputs to the gate 784 are connected to the reset terminals of the flip-flops 726 and 727 so that these two inputs receive ground potential after an elapsed time of eight hundred milliseconds.

Since the terminal of the gate 784 connected to the output of the gate 758 receives ground potential until the first line transition in the reply is received, the output of the gate 784 drops to a negative potential if a channel transistion has not been received at the end of eight hundred milliseconds. This negative potential completes the enabling of the gate 782 to apply ground potential to the set input-output terminal of the flip-flop 886. This sets the flip-flop to apply a more negative enabling potential to its reset output terminal to enable the center input to the gate 948. This means that a positive-going pulse will be applied to the "2" conductor in the cable 980 when the address "30019" is received indicating an open circuit error.

The ground potential at the output of the gate 782 also inhibits one input to the gate 796 so that its output drops to a more negative potential and controls the busy flip-flop including the gates 876 and 878 to mark the line unit 110 as idle. This prevents the line unit 110 from being marked permanently busy in the event that the signaling channel 108 becomes open. The more negative potential provided at the reset output terminal of the set flip-flop 886 is also returned to one input of the gate 828 to reset the reply flip-flop including the gates 826 and 828.

The line unit 110 also includes means for insuring that a reply has not been garbled by the receipt of a large number of pulses of short duration which could arise for a number of different reasons. These short duration pulses could appear as "0's" to the gate 806 and to the monostable circuit 702 during a reply. This would mean that the bits in the register stages in the shift register 840 would be largely "0's" and that the preliminary "1" initially set into the stage 841 of the shift register 840 would not be in its expected position in the flip-flop 852 but would be shifted beyond that to the flip-flop 854. The coupling between the flip-flops 853 and 854 is one-sided or such that once the flip-flop 854 has been set from the flip-flop 853 during a shifting operation, it cannot be reset except by the reset emitter follower 856. Thus, whenever a number of short duration pulses are received which would destroy the accuracy of the reply, the flip-flop 854 is set, and the flip-flop 853 is in a reset condition.

This abnormality is detected by a gate 780, one input of which is connected to the reset terminal of the flip-flop 853 and another input of which is connected to the set terminal of the flip-flop 854. The other input of the gate 780 is connected through an inverter 778 to the output of the gate 776. The inverter 778 normally applies an inhibiting potential to the connected terminal of the gate 780 but applies a negative enabling potential thereto when the signaling channel 108 returns to its normal mark condition at the end of a reply after one hundred and thirty-three milliseconds have elapsed and if at least one line transition was received during the reply. If the flip-flop 853 is set and the flip-flop 854 is reset indicating a proper reply, the gate 780 is fully enabled, and a ground inhibiting potential is applied to the terminal "$\overline{OK}$" connected to the gate 946. This means that a bit is not provided on the "4" conductor in the cable 980 when the address "30018" is received, thus indicating that the call was correct or "OK." Alternatively, if the flip-flop 853 is reset or the flip-flop 854 is set, the left-hand or the center input to the gate 780 receives an inhibiting potential, and the terminal "$\overline{OK}$" is supplied with a negative potential by the gate 780. This enables the connected gate 946, and a positive-going pulse is applied to the "4" conductor in the cable 980 when the address "30018" is received. The presence of the bit on the "4" conductor indicates that the call was not correct or "$\overline{OK}$."

Another error detected by the line unit 110 is the absence of a response from the called home unit for a period of five hundred and forty-one milliseconds after the channel 108 returns to a mark condition at the end of the transmission of the designation of the home unit. This error is stored in the no-response flip-flop 882 which is reset each time that the shift register 840 is reset. The set terminal of the flip-flop 882 is connected to the output of a "NOR" gate 797, one input of which receives a ground potential signal from the output of a gate 822 after an elapsed time of five hundred and forty-one milliseconds following the preceding resetting of the timing counter 720. The two inputs to the gate 822 are connected to the reset outputs of the flip-flops 721 and 727. The center input of the gate 797 is connected to the output of the inverter 734 and receives ground potential at the termination of the transmission of the call when the relay 732 is reoperated by placing the channel 108 in a mark condition. The right-hand input of the gate 797 is connected to the output of the gate 756 which is reset to a condition supplying ground potential by the emitter follower 856 when the shift register 840 is reset at the termination of the transmission of the call.

This means that if at least one line transition is not received from the channel 108 following the termination of the transition of the station designation within a period of five hundred and forty-one milliseconds, all of the inputs to the gate 797 are placed at ground potential, and the output of this gate drops to a more negative potential. When a more negative potential is applied to the set input terminal of the flip-flop 882, the input capacitor is charged. When the flip-flop 721 is complemented by the clock pulser 728, the gate 822 is inhibited, and the output of the gate 797 rises toward ground potential. This sets the no-response flip-flop 882 so that a negative potential is applied to the terminal "NR." This potential partially enables the gate 945 so that a positive-going pulse is applied to the "2" conductor in the cable 980 when the address "30018" is received. This bit indicates a lack of response from the interrogated home unit within the five hundred and forty-one millisecond period set for the reply. This reply period for receiving the first line transition is long enough to compensate for any delays and transmission time from the remote home units.

The line unit 110 also includes means for resetting the busy latch including the "NAND" gates 876 and 878 when no response is received so that the line unit 110 does not permanently remain in a busy condition. This is accomplished by applying an inhibiting potential to the left-hand input of the gate 796, the output of which is connected to one input of the gate 876. More specifically, the left-hand input to the gate 796 is connected to the output of an inverter 795, the input of which is connected to the output of a "NOR" gate 794. The left-hand input of the "NOR" gate 794 is connected to the output of a "NOR" gate 793. One of the inputs to the "NOR" gate 793 is connected to the output of the inverter 730 to receive a negative potential whenever the signaling channel 108 is in a mark or closed circuit condition. The other input to the "NOR" gate 793 is connected to the reset terminal of the flip-flop 854 which receives a ground potential if the stage 854 has not been set. Thus, the gate 793 supplies ground potential to the left-hand input of the gate 794 whenever the line is in a mark or closed circuit condition, as would be the case when a response has not been received from the home unit.

The right-hand input to the gate 794 is connected to the output of the gate 822 and is supplied with ground potential when the stages 721 and 727 in the timing counter are set to indicate an elapsed time of five hundred and forty-one milliseconds. At this time, both inputs of the gate 794 are at ground potential, and the output of the gate 794 drops to a negative potential to place the inverter 795 in conductive condition. This applies a ground inhibiting potential to one input of the gate 796 so that its output drops to a negative potential and resets the busy flip-flop including the gates 876 and 878 in the manner described above.

It should also be noted that the left-hand input of the "NOR" gate 793 receives a negative potential if the stage 854 is set indicating the receipt of more than the expected number of bits in the reply from the home unit. This negative enabling potential controls the gate 793 so that ground is applied to the left-hand input of the gate 794. Thus, the inverter 795 will be placed in a conductive condition at the end of five hundred and forty-one milliseconds to apply an inhibit to one input of the gate 796 and thus reset the busy latch in the event that an excessive number of bits are received in the reply regardless of whether the signaling channel 108 is left in a mark or space condition.

The right-hand terminal of the gate 793, which is to receive ground potential at the end of five hundred and forty-one milliseconds, might not do so if the abnormal condition is the one described in the preceding paragraph in which an excessive number of bits or apparent bits are received in the reply. This is due to the resetting of the timing counter 720 each time that a bit is received from the signaling channel. To prevent this, the setting of the stage 854 inhibits the reset pulse generating means for the timing circuit 720. More specifically, the setting of the stage 854 applies a negative potential to the left-hand input of the gate 714 so that this gate applies ground potential to the input of the inverter 712. The output of the inverter 712 drops to a more negative potential and clamps the output of the gate 708 near ground potential. Thus, any changes in the monostable circuit 702 and the inverter 706 cannot control the gate 718 to generate a reset pulse for the timing counter 720 until the shift register 840 is reset.

The line unit 110 also includes means for permitting communication between the central computing means 102 and a fieldman in a geographically remote area by means of a fieldman's test unit which can be connected to any one of the home units in the field. This test unit, among other things, transmits a distinctive reply to the computer 102 whenever it is connected to a home unit, and this distinctive reply advises the computer that the fieldman is at a given home unit and is to be called from the central office.

In the illustrative example above in which the home unit 106 is called, it is assumed that the test unit is connected to the home unit 106 at the time that this home unit is interrogated by the line unit 110. This test unit, instead of permitting the normal eleven bit reply to be transmitted by the home unit 106, transmits a nine bit reply consisting entirely of zeros. The line unit 110 receives the nine zeros from the home unit 106 on the signaling channel 108 in the manner described above so that at the end of the reply when the channel 108 is restored to a continuous mark condition, zeros are stored in the flip-flops 841–850 and the preliminary "1" is stored in the flip-flop 851. The flip-flops 852–854 remain in the "0" setting to which they were previously operated by the preceding reset signal from the emitter follower.

Since the normal eleven bit reply has not been received by the line unit 110, the preliminary bit is not stored in the flip-flop 853, and the reset condition of this flip-flop applies an inhibiting potential to the left-hand input of the "NAND" gate 780. Thus, the output from this gate is held at a negative potential to partially enable the gate 946 and indicate that a correct response has not been received from the previously interrogated home unit 106. The line unit 110 also decodes the condition or information stored in the shift register 840 to provide a positive indication that a fieldman is calling the central office.

This information is decoded in the following manner. The gates 762, 764, and 766 operate in the manner described above because the flip-flops 841–850 are all reset. Accordingly, the output of the gate 766 provides a negative potential which is applied to the input of an inverter 768 to place this inverter in a conductive condition so that a ground signal is applied to the upper input to a "NOR" gate 722. The center input of this gate is connected to a "NAND" gate 770, the inputs of which are connected to the reset terminal of the set flip-flop 851, and the set terminals of the reset flip-flops 852–854. Thus, the gate 770 is fully enabled, and ground potential is applied to the center input of the "NOR" gate 772. The lower input to the gate 772 receives ground signal from the output of the gate 776 when the line or signaling channel 108 has been in a mark condition for one hundred and thirty-three milliseconds. The signal provided at the output of the gate 776 also resets the busy latch including the gates 876 and 878 in the manner described above.

When all of the inputs to the gate 772 are placed at ground potential, the output of this gate drops to a negative potential which is applied to the center input terminal of the gate 944 to partially enable this gate. The output of the gate 772 is also applied to an inverter 774 to illuminate a lamp 774a to provide a visible indication that a call to a fieldman from the central office is required. Since only the flip-flop 851 is in a set condition, only the gates 932, 944, 946 in the output means 930 are partially enabled.

With the line unit 110 now in an idle condition and with the fieldman response from the test set at the home unit 106 now stored in the shift register 840 and the output means 930, the line unit 110 can be interrogated by the computer 102 to transmit the reply previously received from the test set at the home unit 106 to the memory 114. The decimal message produced by interrogating the addresses "30014–30019" is "100050," the "1" resulting from the enabled "1" bit gate 932 at the address "30014" and the "5" resulting from the enabled "1" bit gate 944 and "4" bit gate 946 at the address "30018." This particular response is recognized by the computer 102 as meaning that a fieldman at the home unit 106 desires a call. In response to the receipt of this information, the computer 102 sets up the address of the home unit "127" and adds to it the binary "4" bit at address "30011" (see FIG. 13). The presence of the "4" bit advises the system 100 that a call is being made to a test unit at the indicated station and, in effect, converts the decimal address of the called home unit from "127" to "527."

When the line unit 110 is next seized and the address "527" transferred thereto, the units digit "7" and the tens digit "2" are stored in the flip-flops 844–849 in the manner described in detail above under the control of the addresses "30013" and "30012" set up in the memory address register 140. The address "30011" also causes the setting of the flip-flop 841 and leaves the flip-flop 842 in a reset condition. However, since the inverter 914 is inhibited by the positive-going pulse on the "4" conductor in the cable 1090, the gate 909 is enabled at the address "30011" and provides a positive-going pulse which is coupled through a pair of inverters 872 and 870 to set the flip-flop 850. Thus, a flip-flop in advance of the flip-flop storing the bits of the units digit of the address is set to provide a preliminary "1."

The positive-going pulse provided by the enabling of the gate 909 also sets the flip-flop 866 so that ground potential is applied to the upper input of the "NAND" gate 864. This drops the output of this gate to a negative potential and places the inverter 812 in a conductive condition so that an inhibiting signal is applied to the center input of the gate 814. The output of this gate is connected in common with the output of the gate 816. The center input of the gate 816 is enabled by the signal from the output of the gate 864, and the lower input of the gate 816 is connected to the output of the gate 824 which is enabled following an elapsed time of seventy-five milliseconds, as described above. The upper input to the gate 816 is connected to the reset terminal of the flip-flop 853. Thus, when the flip-flop 866 is set, control over the transmission of binary "1" and "0" signals is transferred from the gate 814 used in normal calls to the gate 816 which is used on fieldman calls. The gate 816 performs the same control functions as the gate 814 except that it is responsive to the state of the flip-flop 853, whereas the gate 814 responds to the state of the flip-flop 851. The line unit 110 now transmits over the channel 108 the same signals designating the home unit 106 as before, which are stored in the flip-flops 842–849, but these signals are preceded by the code "10" stored in the flip-flops 850 and 851.

The transmission of this call over the channel 108 to all of the connected home units takes place in the manner described above except for the termination of the call. More specifically, since the gate 864 now provides a negative output, the lower input to a gate 832 is enabled. The upper input to the gate 832 is connected to the output of a "NAND" gate 834, the inputs of which are connected to the set terminals of the flip-flops 851 and 852. When the first nine stages of flip-flops 841–850 are reset, the gate 766 provides a negative output in the manner described above. This provides an enabling potential for the center input of the gate 830. The left-hand input to the gate 830 is provided with enabling potential from the set terminal of the flip-flop 841. However, the right-hand input to the gate 830 is provided with an inhibiting potential by the gate 832. When the last two bits of the call are transmitted by shifting these bits through the flip-flops 851 and 852 to the flip-flop 853, both inputs to the gate 834 are enabled, and ground is applied to the upper input of the gate 832. This drops the output of this gate to a negative potential to complete the enabling of the gate 830 so that the reply flip-flop, including the gates 826 and 828, is reset in the manner described above to produce the control functions described in detail above. The message from the fieldman is now sent from the test unit and stored in the output means 930 in the form of enabling signals selectively supplied to the gates 932–949 therein under the control of the connected stages of the shift register 840 and the other information storing components in the line unit 110.

When the addresses "30019–30014" are next presented under the control of the computer 102, the message from the fieldman is read out of the output means 930 in the manner described above. However, when the address "30014" is presented, the selective enabling of the gate 924 not only resets the shift register 840 through the emitter follower 856 in the manner described above, but also supplies a positive-going pulse to the reset terminal of the flip-flop 866 to reset this flip-flop. When the flip-flop 866 is reset, the upper input to the gate 864 receives a negative enabling potential. However, since the capacitor to the set input of the flip-flop 868 has been charged in the interval in which the flip-flop 866 was set, the resetting of this flip-flop applies a positive-going pulse to the set input terminal of the flip-flop 868 to set this flip-flop so that ground potential is applied to the lower input of the gate 864. This maintains the output of this gate at a negative potential to inhibit the gate 814 and to enable the gate 816, the gate 832 also being partially enabled by this potential.

The computer 102 then transmits a call which is a message to the test unit and which can comprise, for instance, the decimal designation "377" or the binary message "11111111." When this call is presented to the line unit 110 with the addresses "30011–30013," all of the gates 901–908 are enabled to set all of the stages or flip-flops 842–849. The stage 841 is set with the preliminary "1" condition when the shift register 840 is reset in the manner described above. Since the gate 814 is inhibited and the gate 816 is partially enabled and is responsive to the setting of the flip-flop 853, the message now transmitted under the control of the shift register 840 is a message consisting of all "1's" preceded by two "0's." This call triggers the fieldman test unit to display the eight "1" bits. This call is terminated under the control of the gates 830, 832, and 834. When the reply flip-flop, including the gates 826, 828, is reset, the positive-going signal derived from the output of the flip-flop 828 resets the flip-flop 868 so that a negative enabling signal is applied to the lower input of the gate 864. This completes the enabling of the gate 864 so that its output potential rises to ground and enables the gate 814 while disabling the gates 816 and 832. The line unit 110 is now in condition for a normal cycle of operation.

Although the present invention has been described with reference to a single illustrative embodiment, it should be understood that numerous other modifications and embodiments can be devised by those skilled in the art that will fall within the spirit and scope of the principles of this invention.

What is claimed and desired to be secured by Letters Patent of the United States is:

1. A system for collecting data from a plurality of geographically remote stations in a central data handling means, the remote stations each having an individual designation and sending means for sending variable data items when its individual designation is received, the central data handling means including an address storing means and a data storing means with individually addressed storage units, which system comprises:

a plurality of signaling channels each connecting a group of remote stations, a plurality of channel terminating units each connected to one of the channels, register means in each of the channel terminating units, first gate means in each channel terminating unit having an individual address and operative to store a station designation from the data storing means in the register means, means in each channel terminating unit controlled by the register means for transmitting the stored station designation over the connected signaling channel and for storing variable data items received from the signaling channel in the register means, second gate means in each channel terminating unit having an individual address and operative to read out data from the register means to the data storing means in the central data handling means, and control means for directly addressing the data storing means and the first and second gate means in the plurality of channel terminating units in accordance with addresses in the address storing means to control the selective transmission of designations and data items between the plurality of geographically remote stations and the data storing means.

2. A system for collecting data from a plurality of geographically remote stations in a central data handling means, the remote stations each having an individual designation and sending means for sending variable data items when its individual designation is received, the central data handling means including an address storing means and a data storing means with individually addressed storing units, which system comprises:

a plurality of signaling channels each connecting a group of the remote stations, a plurality of channel terminating units each connected to one of the channels, register means in each of the channel terminating units including a plurality of bistable stages, a plurality of gate units coupled to the stages of the register means, means coupling the gate units to the data storage means to receive signals representing station designations from different storage units, address detecting means in each of the channel terminating units ocoupled to the address storing means, each address detecting means including means controlled by the receipt of the address individual to the channel terminating unit for rendering the gate units effective to transfer a station designation to the stages of the register means from the data storing means, and transmitting means in each of the channel terminating units controlled by the register means for transmitting the stored station designation over the signaling channel.

3. A system for collecting data from a plurality of geographically remote stations in a central data handling means, the remote stations each having an individual designation and sending means for sending variable data items when its individual designation is received, the central data handling means including an address storing means and a data storing means with individually addressed storage units, which system comprises:

a plurality of signaling channels each connecting a group of the remote stations, a plurality of channel terminating units each connected to one of the channels, register means in each of the channel terminating units, means coupling the register means in the channel terminating units to the data storing means in the central data handling means, address detecting means in each of the channel terminating units coupled to the address storing means in the central data handling means, means in each channel terminating unit controlled by the address detecting means and responsive to the receipt of the address individual to the channel terminating unit for storing a station designation in the register means derived from an addressed storage unit in the data storing means, transmitting means in each channel terminating unit controlled by the register means for transmitting a station designation stored in the register means to all of the remote stations on the signaling channel, and means in each channel terminating unit effective when a station designation is stored in the register means for placing the transmitting means in operation.

4. The system set forth in claim 3 including:

a busy indicator in each of the channel terminating units, each busy indicator having an individual address, and means in each channel terminating unit for placing the busy indicator in a busy condition during the interval in which the transmitting means is in operation.

5. A system for collecting variable items of data from a plurality of remote points at a central data handling office of the type having both address storing means and data storage means with discrete storage units having individual addresses, which system comprises:

a plurality of remote stations at the remote points each identified by an individual designation, each of the stations including data receiving means and data transmitting means, a plurality of signaling channels each connecting a different group of remote stations, a plurality of line units each terminating one of the signaling channels and including both data receiving means and data transmitting means, the data transmitting means in each line unit having an individual address and the data receiving means in each line unit having an individual address, means coupling the line units to the address storing means and the data storage means in the central data handling office, means in each line unit responsive to the presentation of the address of its data transmitting means and the address of one of the storage units in the address storing means for transmitting the designation of a remote station derived from the addressed storage unit to all of the stations connected to the signaling channel terminated by the line unit containing the addressed data transmitting means, and means in each line unit responsive to the presentation of the address of its data receiving means and the address of one of the storage units in the address storing means for transferring data from the line unit containing the addressed data receiving means to the addressed storage unit in the data storage means.

6. A system for collecting variable items of data from a plurality of remote points at a central data handling office of the type having both address storing means and data storage means with discrete storage units having individual addresses, which system comprises:

a plurality of remote stations at the remote points each identified by an individual designation, each of the stations including data receiving means and data transmitting means, a plurality of signaling channels each connecting a different group of remote stations, a plurality of line units each terminating one of the signaling channels and including both data receiving means and data transmitting means, the data transmitting means in each line unit having an individual address and the data receiving means in each line unit having an individual address, each of said line units also including register means forming a part of the data transmitting means and data receiving means, means coupling the line units to the address storing means and the data storage means in the central data handling office, first control means in each of the line units responsive to the presentation of the address of its data transmitting means in the address storing means for storing the designation of one of the stations connected to the channel terminated by this line unit in the register means in the line unit, said first control means also including means for transmitting the station designation stored in the register means to all of the stations on the channel terminated by this line unit to select the station identified by the transmitted designation, second control means in each of the line units operative to clear the register means following the transmission of the station designation and to prepare the register means to receive and store variable data items transmitted by the selected station, and third control means in each of the line units responsive to the presentation of the address of its data receiving means in the address storing means for transferring the data stored in the register means of only the addressed data receiving means to one of the storage units in the data storage means.

7. A system for supplying variable items of data to a central data handling means from a plurality of geographically remote stations, the remote stations having individual designations and including data sending means, the central data handling means including address storing means and data storing means with inividually addressed storage units, the central data handling means also including timing signal means providing timing signals which define an operating cycle of the central data handling means and which synchronize the transfer of data in the central data handling means, which system comprises:

a plurality of signaling channels each connecting a group of the geographically remote stations, a plurality of line units each terminating one of the signaling channels, each of the line units including a designation sending means with an individual address and a data storing and receiving means with an individual address, first control means responsive to the timing signals for transferring a remote station designation from a storage unit identified by an address in the address storing means to the designation sending means in a line unit identified by an address in the address storing mean, said first control means being controlled by the timing signals to effect the transfer of the remote station designation from the addressed storage unit to the addressed designation sending means in synchronism with the operation of the central data handling means, means in each line unit responsive to the transfer of a remote station designation to the designation sending means in the line unit for transmitting the remote station designation and for rendering the data receiving and storing means in the same line unit effective to receive and store variable data items transmitted to this line unit over the signaling channel from the remote station identified by the transmitted remote station designation, the reception and storage of the variable data items occurring in an asynchronous relation with the operation of the central data handling means, and second control means responsive to the timing signals and the addresses in the address storing means for transferring the variable data items in the data receiving and storing means identified by the address stored in the address storing means to a storage unit identified by the address in the address storing means, said second control means being controlled by the timing signals to effect the transfer of the varible data item from the addressed data receiving and storing means in the line unit of the addressed storage unit in synchronism with the operation of the central data handling means and without interruption thereof.

8. A data transmitting system for transmitting binary coded signals over a signaling channel comprising:

a plural stage shift register for storing a message of "0's" and "1's" to be transmitted, a shift signal source coupled to the shift register to shift the message along the stages of the shift register, sending means for supplying distinctive signals representing a "0" and "1" to the signaling channel in accordance with the message stored in the shift register, first control means responsive to the "0's" and "1's" shifted in sequence into one of the stages of the shift register for controlling the sending means to apply corresponding signals to the signaling channel, and second control means for rendering different one of the stages of the shift register effective to control the first control means.

9. A data transmitting system for transmitting binary coded signals over a signaling channel comprising:

a plural stage shift register for storing a message of "0's" and "1's" to be transmitted, a shift signal source coupled to the shift register to shift the message along the stages of the shift register, sending means for supplying different duration signals representing "0" and "1" to the signaling channel in accordance with the message stored in the shift register, timing means coupled to the sending means and providing a signal of a first duration representing a "0" and a signal of a different second duration representing a "1,"

first control means for rendering the "0's" and "1's" shifted into one stage of the shift register effective to control the operation of the sending means by the first and second duration signals, second control means for rendering the "0's" and "1's" shifted into a different stage of the shift register effective to control the operation of the sending means by the first and second duration signals, and means operable to selectively render the first and second control means effective.

10. A system for transmitting messages having different predetermined numbers of bits to a signaling channel, comprising:

register means having a number of separate register stages at least as large as the largest predetermined number of bits in a message, transmitting means controlled by the register means to transmit the different bits of a message stored in the register means, an end of message indicating means for indicating the completion of the transmission of a message to the signaling channel, first control means responsive to the setting of the register means for operating the end of message indicating means, and second control means operable to render said first control means responsive to control by different stages of the register means to operate said end of message indicating means when different predetermined numbers of bits are transmitted.

11. A system for transmitting messages having different predetermined numbers of bits to a signaling channel, comprising:

register means having a number of separate register stages at least as large as the largest predetermined number of bits in a message, transmitting means controlled by the register means for transmitting the different bits of a message over the channel, an end of message indicating means for indicating the end of message transmission to the signaling channel, first means controlled by the register means for operating the end of message indicating means when a first predetermined number of bits have been transmitted, second means controlled by the register means for operating the end of message indicating means when a second predetermined number of bits different from the first predetermined number have been transmitted, and control means for rendering a selected one of the first and second means effective to control the end of message indicating means.

12. A system for receiving reply messages having different numbers of bits transmitted over a signaling channel from a sending unit capable of transmitting messages having at least two different numbers of bits therein, which system comprises:

register means having a number of register stages at least as great as the largest number of bits that can be transmitted by the sending unit, transmitting means coupled between the register means and the signaling channel for transmitting bits to the channel under the control of the register stages, end of message indicating means controlled by the number of bits transmitted to the signaling channel for indicating the end of a message, and control means for controlling the transmitting means to send one of two given numbers of bits over the signaling channel to the sending unit to control the sending unit to send a message having a given one of the two different numbers of bits and for operating the end of message indicating means to a condition in which it provides an indication of the end of message only when the given one of the two different numbers of transmitted bits has been sent over the signaling channel.

13. The system set forth in claim 12 in which:

the end of message indicating means includes a pair of detecting means responsive to the settings of stages in the register means, and in which the control means includes means for rendering a given one of the detecting means effective in accordance with the given number of bits in the transmitted message.

14. A system for transmitting messages having different numbers of bits over a signaling channel, which system comprises:

shift register means having a number of stages at least as large as the maximum number of bits in a message and including an output stage, signal sending means coupled between the signaling channel and the output stage for sending successive bits over the channel, a shift pulse source coupled to the shift register means for shifting the bits stored in different ones of the stages to the output stage, end of message indicating means coupled to at least some of the stages of the shift register means for producing an indication of the end of a transmitted message, and control means operable when the signal sending means transmits messages of different numbers of bits for rendering the end of message indicating means responsive to different ones of the stages in the shift register.

15. A system for transmitting data messages to selected stations on a signaling channel, which system comprises:

register means having a number of register stages at least as large as the maximum number of bits in the messages transmitted to the stations, means for storing data to be transmitted over the channel to the stations in the stages of the register means, transmitting means controlled by the register means and coupled to the channel for transmitting the data stored in the register means, first control means for rendering different stages of the register means effective to control the transmitting means, end of message indicating means for indicating the end of a message transmitted to a station, and second control means for rendering different ones of the stages in the register means effective to control the end of message indicating means in dependence on the number of bits in the transmitted message.

16. The system set forth in claim 15 including:

bistable circuit means operable to alternate states, and means controlled by the state of the bistable circuit means for controlling the first and second control means.

17. A system for transmitting data to selected stations on a signaling channel, which system comprises:

shift register means having a number of register stages at least as large as the maximum number of bits in the messages transmitted from the stations, one of said stages providing an input stage, means for storing data to be transmitted over the channel to the stations in the stages of the register means, a shift pulse source coupled to the shift register means for shifting data stored therein along the stages, transmitting means controlled by the register means and coupled to the channel for transmitting the data stored in the register means, first control means for rendering the transmitting means responsive to control by the data shifted into different ones of the register stages, end of message indicating means for indicating the end of a message transmitted to a station, and second control means for rendering different ones of the stages in the shift register means effective to control the end of message indicating means in dependence on the number of bits in the transmitted message.

18. The system set forth in claim 17 including:

an additional control means for controlling the first and second control means to select stages in the shift register means to control the end of message indicating means in accordance with the stages in the shift register means selected to control the transmitting means.

19. A system for transmitting data over a signaling channel comprising:

signal sending means coupled to the channel and operable to two different states to place the channel in two different states, control means for operating the signal sending means in accordance with the data to be transmitted so that the channel is placed in its different states, detecting means coupled to the channel for detecting transitions in the channel between its different states, and indicating means controlled by the detecting means and including timing means controlled by the control means for producing an indication whenever a transition in the state of the channel occurs outside of a predetermined time interval following each operation of the signal sending means by the control means.

20. A system for transmitting data over a signaling channel comprising:

signal sending means coupled to the channel and operable to two different states to place the channel in two different states, detecting means coupled to the channel and operable to detect a transition in the channel between either of its two states, error indicating means controlled by the detecting means for producing an indication of a signal sending error in response to a transition in the state of the channel, control means for operating the signal sending means at time spaced intervals to change the state of the channel in accordance with data to be transmitted over the channel, and timing means operated by the control means for inhibiting operation of the indicating means by the detecting means for a predetermined period of time following each operation of the signal sending means so that the error indicating means is operated when the channel transition does not take place within the predetermined period following the operation of the signal sending means by the control means.

21. A system for receiving signals from a signaling channel over which data is transmitted by placing the channel in two different states comprising:

detecting means coupled to the channel and responsive to transitions in the channel between its two different states, said detecting means providing a transition signal representing a transition in the channel, timing means operable to begin a new timing cycle in response to each transition in the state of the channel, indicating means for indicating an abnormality in the received signals, and control means responsive to the transition signals and controlled by the timing means for operating the indicating means if the channel changes state at a time that is either less than or more than a given time interval following the preceding change in the state of the channel.

22. A system for receiving signals from a signaling channel over which data is transmitted by placing the channel in two different states comprising:

detecting means coupled to the channel and responsive to transitions in the channel between its two different states, said detecting means providing a transition signal representing a transition in the channel, timing means operable to begin a new timing cycle in response to each transition in the state of the channel, indicating means for indicating an abnormality in the received signals, signal responsive gate means coupled to the indicating means for operating the indicating means when an abnormality occurs in the reception of a transmitted signal, means coupling the transition signal from the detecting means to the gate means, and means controlled by the timing means for inhibiting the gate means during a given interval in which a change in the state of the channel is expected and for enabling the gate for control by the transition signal prior to and following the given interval.

23. A system for transmitting data to and receiving data from a signaling channel comprising:

relay means coupled to the channel for transmitting data over the channel, signal responsive means coupled to the relay means for controlling the operation thereof and including an input, means connected to the input for supplying signals to the input representing the data to be transmitted, bistable circuit means coupled to the input, and control means for operating the bistable circuit to two alternate states, said bistable circuit being operable in one of said states to hold said input at a given potential to prevent operation of the relay means when data is being received from said channel, said bistable circuit being operable in its other state to render said input responsive to signals supplied to the input.

24. A pulse generating circuit comprising:

an "OR" gate means having an output and at least a pair of inputs, a pulse utilization means coupled to the output of the gate means, an inverter connected to a first input to the gate means and having an input, capacitive means connected to the input of the inverter, and a pulse source connected to the input to the inverter and the second input to the gate means.

References Cited

UNITED STATES PATENTS

| | | | |
|---|---|---|---|
| 2,870,429 | 1/1959 | Hales | 340—147 |
| 3,072,804 | 1/1963 | Aaronson | 307—88.5 |
| 3,245,040 | 4/1966 | Burdett et al. | 340—172.5 |
| 3,281,788 | 10/1966 | Hernan et al. | 340—152 |
| 3,283,306 | 11/1966 | Patrusky | 340—172.5 |
| 3,289,170 | 11/1966 | Currey et al. | 340—172.5 |
| 3,297,996 | 1/1967 | Grady | 340—172.5 |
| 3,305,839 | 2/1967 | Looschen et al. | 340—172.5 |
| 3,323,112 | 5/1967 | Haselwood et al. | 340—172.5 |
| 3,333,250 | 7/1967 | Hill et al. | 340—172.5 |

PAUL J. HENON, *Primary Examiner.*

R. B. ZACHE, *Assistant Examiner.*